(12) United States Patent
Salles et al.

(10) Patent No.: US 12,181,292 B2
(45) Date of Patent: Dec. 31, 2024

(54) AUTOMATIC ALTERNATE TRANSPORTATION

(71) Applicant: TOYOTA MOTOR NORTH AMERICA, INC., Plano, TX (US)

(72) Inventors: Felipe G. Salles, Garland, TX (US); Shintaro Iwaasa, Frisco, TX (US); Louis Brugman, Frisco, TX (US); Devang H. Parekh, Dallas, TX (US); Robert D. Slater, Murphy, TX (US); Christopher J. Risberg, Flower Mound, TX (US); Nutonya L. Parker, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 18/298,293

(22) Filed: Apr. 10, 2023

(65) Prior Publication Data

US 2023/0243659 A1   Aug. 3, 2023

Related U.S. Application Data

(63) Continuation of application No. 16/827,653, filed on Mar. 23, 2020, now abandoned.

(51) Int. Cl.
*G01C 21/34* (2006.01)
*G01C 21/36* (2006.01)
*G08G 1/00* (2006.01)
*G06Q 10/0631* (2023.01)

(52) U.S. Cl.
CPC ..... *G01C 21/3407* (2013.01); *G01C 21/3605* (2013.01); *G01C 21/3664* (2013.01); *G01C 21/3691* (2013.01); *G08G 1/20* (2013.01); *G06Q 10/0631* (2013.01)

(58) Field of Classification Search
CPC ............ G01C 21/3407; G01C 21/3605; G01C 21/3664; G01C 21/3691; G01C 21/3415; G08G 1/20; G08G 1/096811; G08G 1/202; G06Q 10/0631
See application file for complete search history.

(56) References Cited

U.S. PATENT DOCUMENTS

| | | |
|---|---|---|
| 7,283,902 B2 | 10/2007 | Heider et al. |
| 8,583,320 B2 | 11/2013 | Harris et al. |
| 8,612,140 B2 | 12/2013 | Gutman |
| 8,942,918 B2 | 1/2015 | Hansen et al. |
| 8,947,531 B2 | 2/2015 | Fischer et al. |
| 8,977,408 B1 * | 3/2015 | Cazanas ............... H04L 67/306 455/3.03 |
| 9,104,537 B1 | 8/2015 | Penilla et al. |

(Continued)

FOREIGN PATENT DOCUMENTS

| | | |
|---|---|---|
| CA | 2685910 C | 7/2014 |
| CN | 1714275 B | 2/2012 |

(Continued)

*Primary Examiner* — Abdalla A Khaled

(57) ABSTRACT

An example operation includes one or more of determining, by a server, that a transport is inoperable on a route, instructing, by the server, an alternate transport to navigate to the transport, configuring, by the server, the alternate transport based on a configuration of the transport and routing, by the server, the configured alternate transport to an intended destination of the transport.

20 Claims, 22 Drawing Sheets

(56) References Cited

U.S. PATENT DOCUMENTS

| | | |
|---|---|---|
| 9,153,084 B2 | 10/2015 | Ricci |
| 9,261,376 B2 | 2/2016 | Zheng et al. |
| 9,367,239 B2 | 6/2016 | Pinkus et al. |
| 9,378,601 B2 | 6/2016 | Ricci |
| 9,507,346 B1 | 11/2016 | Levinson et al. |
| 9,648,107 B1 | 5/2017 | Penilla et al. |
| 9,755,850 B2 | 9/2017 | Stolfus |
| 10,019,009 B2 | 7/2018 | Chintakindi et al. |
| 10,054,947 B2 | 8/2018 | Mays |
| 10,086,699 B2 | 10/2018 | Konet et al. |
| 10,324,463 B1 | 6/2019 | Konrardy et al. |
| 2005/0017842 A1* | 1/2005 | Dematteo .......... G07C 9/00309 340/5.72 |
| 2006/0104712 A1 | 5/2006 | Bufano et al. |
| 2006/0206261 A1 | 9/2006 | Altaf et al. |
| 2007/0038345 A1* | 2/2007 | Heider ................. B60R 16/037 701/49 |
| 2008/0004802 A1 | 1/2008 | Horvitz |
| 2009/0079839 A1 | 3/2009 | Fischer et al. |
| 2010/0280748 A1 | 11/2010 | Mundinger et al. |
| 2012/0084001 A1 | 4/2012 | Suzuki |
| 2013/0197674 A1* | 8/2013 | Lowry ................. B60W 50/08 700/19 |
| 2015/0221048 A1 | 8/2015 | Zenhauser et al. |
| 2015/0228129 A1 | 8/2015 | Cox et al. |
| 2016/0071418 A1 | 3/2016 | Oshida et al. |
| 2016/0282874 A1 | 9/2016 | Kurata et al. |
| 2016/0328244 A1* | 11/2016 | Ahmed ............... G06F 3/04886 |
| 2016/0334797 A1* | 11/2016 | Ross ..................... G08G 1/202 |
| 2017/0090480 A1* | 3/2017 | Ho ........................ B60W 30/00 |
| 2017/0186324 A1* | 6/2017 | Fish .................... G07C 5/0816 |
| 2018/0209803 A1 | 7/2018 | Rakah et al. |
| 2018/0326997 A1 | 11/2018 | Sweeney et al. |
| 2018/0349825 A1* | 12/2018 | Yamamoto ....... G06Q 10/06314 |
| 2019/0023278 A1 | 1/2019 | Lowry |
| 2019/0122561 A1 | 4/2019 | Shimizu et al. |
| 2019/0199799 A1* | 6/2019 | Asher ................... G06F 3/0482 |
| 2019/0221127 A1 | 7/2019 | Shannon |
| 2019/0263424 A1* | 8/2019 | Penilla ................. H04L 63/107 |
| 2020/0062175 A1 | 2/2020 | Lee et al. |
| 2021/0024100 A1* | 1/2021 | Calleija ................. G08G 1/202 |

FOREIGN PATENT DOCUMENTS

| | | |
|---|---|---|
| CN | 107346611 A | 11/2017 |
| CN | 108292474 A | 7/2018 |
| DE | 102017203638 A1 | 10/2018 |
| JP | 2019501072 A | 1/2019 |
| KR | 20150128712 A | 11/2015 |
| KR | 101628199 B1 | 6/2016 |
| KR | 20180087395 A | 8/2018 |
| RU | 2571450 C2 | 12/2015 |

* cited by examiner

AUTOMATIC ALTERNATE TRANSPORTATION

CROSS-REFERENCE TO RELATED APPLICATIONS

This application is a continuation of U.S. patent application Ser. No. 16/827,653, filed on Mar. 23, 2020, and is related to U.S. patent application Ser. No. 16/827,666, filed on Mar. 23, 2020, the entire disclosures of which are incorporated by reference herein.

TECHNICAL FIELD

This application generally relates to autonomous transports, and more particularly, to automatic alternate transportation.

BACKGROUND

Vehicles or transports, such as cars, motorcycles, trucks, planes, trains, etc., generally provide transportation needs to occupants and/or goods in a variety of ways. Functions related to transports may be identified and utilized by various computing devices, such as a smartphone or a computer.

When an occupant (referred to as the initial occupant) rides in an autonomous transport to an intended destination, it is possible that the autonomous transport may become inoperable prior to arriving at the intended destination. The autonomous transport may become inoperable due to any number of occurrences, such as lack of fuel/charge, an accident, a mechanical issue, etc. In such occurrences, the initial occupant may be stranded at the location where the autonomous transport became inoperable and may further be burdened with arranging supplemental transportation.

Accordingly, what is needed is a solution for supplemental transportation when an autonomous transport becomes inoperable is desired.

SUMMARY

One example embodiment provides a method that includes one or more of determining, by a server, that a transport is inoperable on a route, instructing, by the server, an alternate transport to navigate to the transport, configuring, by the server, the alternate transport based on a configuration of the transport and routing, by the server, the configured alternate transport to an intended destination of the transport.

Another example embodiment provides a system that includes server, comprising a processor and a memory on which are stored machine readable instructions that when executed by the processor, cause the process to perform one or more of determine that a transport is inoperable on a route, instruct an alternate transport to navigate to the transport, configure the alternate transport based on a configuration of the transport, and route the configured alternate transport to an intended destination of the transport.

A further example embodiment provides a non-transitory computer readable medium comprising instructions, that when read by a processor, cause the processor to perform one or more of determine that a transport is inoperable on a route, instruct an alternate transport to navigate to the transport, configure the alternate transport based on a configuration of the transport, and route the configured alternate transport to an intended destination of the transport.

DETAILED DESCRIPTION

Figure 1A:
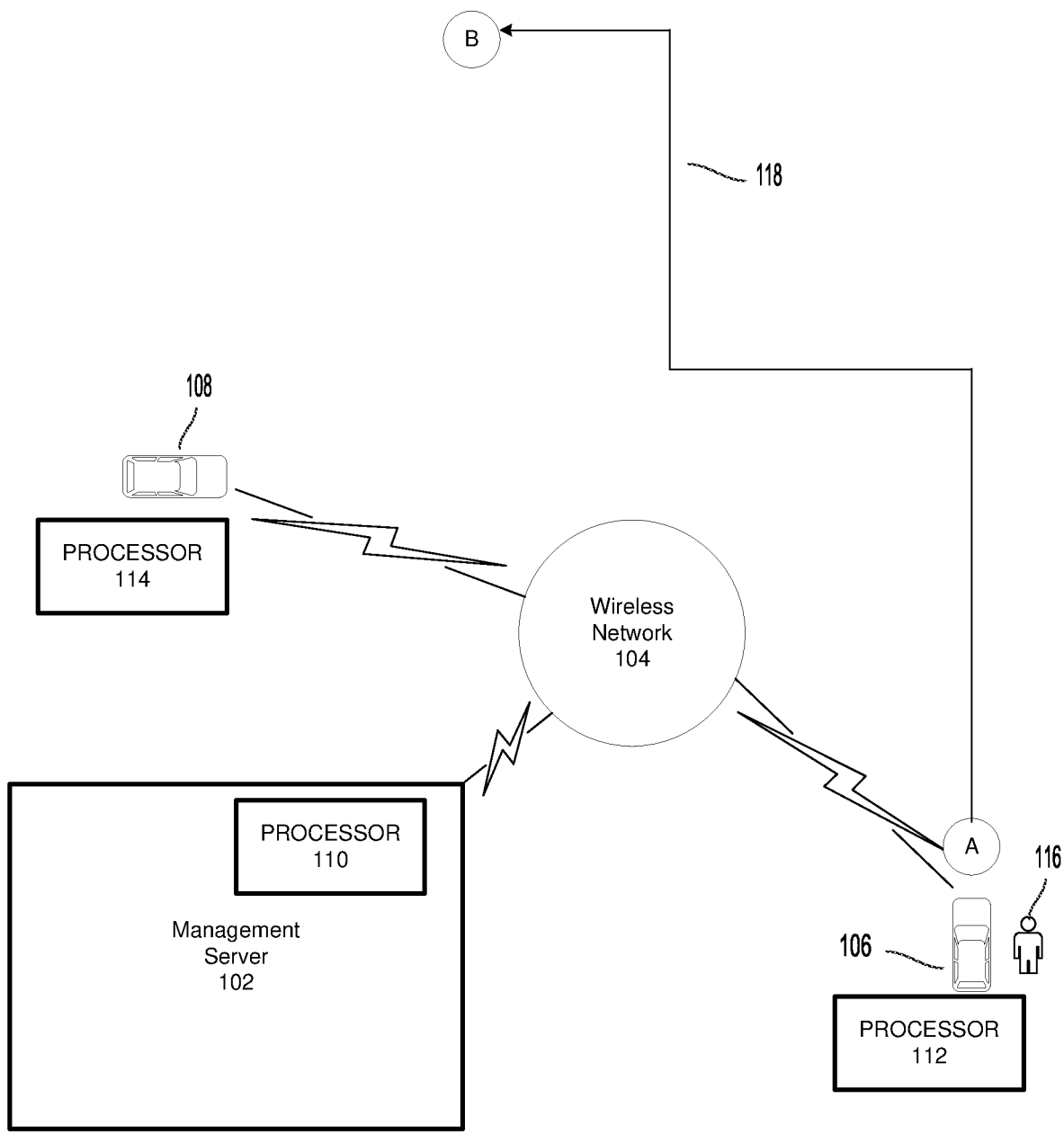
FIG. 1A illustrates an example system for automatic alternate transportation at a time $t_1$, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout least this specification refers to the fact that a particular feature, structure, or characteristic described in connection with the embodiment may be included in at one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments. In the diagrams, any connection between elements can permit one-way and/or two-way communication even if the depicted connection is a one-way or two-way arrow. In the current application, a transport may include one or more of cars, trucks, motorcycles, scooters, bicycles, boats, recreational vehicles, planes, and any object that may be used to transport people and or goods from one location to another.

In addition, while the term "message" may have been used in the description of embodiments, the application may be applied to many types of network data, such as, a packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, components, non-transitory computer readable media, devices, and/or networks, which provide at least one of: a transport (also referred to as a vehicle herein), a data collection system, a data monitoring system, a verification system, an authorization system and a vehicle data distribution system. The vehicle status condition data, received in the form of communication update messages, such as wireless data network communications and/or wired communication messages, may be received and processed to identify vehicle/transport status conditions and provide feedback as to the condition changes of a transport. In one example, a user profile may be applied to a particular transport/vehicle to authorize a current vehicle event, service stops at service stations, and to authorize subsequent vehicle rental services.

Within the communication infrastructure, a decentralized database is a distributed storage system which includes multiple nodes that communicate with each other. A blockchain is an example of a decentralized database which includes an append-only immutable data structure (i.e. a distributed ledger) capable of maintaining records between untrusted parties. The untrusted parties are referred to herein as peers, nodes or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In a public or permissionless blockchain, anyone can participate without a specific identity. Public blockchains can involve cryptocurrencies and use consensus based on various protocols such as proof of work (PoW). On the other hand, a permissioned blockchain database provides a system, which can secure interactions among a group of entities, which share a common goal, but which do not or cannot fully trust one another, such as businesses that exchange funds, goods, information, and the like. The instant application can function in a permissioned and/or a permissionless blockchain setting.

Smart contracts are trusted distributed applications which leverage tamper-proof properties of the shared or distributed ledger (i.e., which may be in the form of a blockchain) database and an underlying agreement between member nodes which is referred to as an endorsement or endorsement policy. In general, blockchain entries are "endorsed" before being committed to the blockchain while entries, which are not endorsed, are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol is used to produce an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node, which can receive client submitted entries, commit the entries and maintain a state and a copy of the ledger of blockchain entries. Peers can also have the role of an endorser, although it is not a requirement. An ordering-service-node or orderer is a node running the communication service for all nodes, and which implements a delivery guarantee, such as a broadcast to each of the peer nodes in the system when committing entries and modifying a world state of the blockchain, which is another name for the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which is used to store an immutable, sequenced record in blocks. The ledger also includes a state database, which maintains a current state of the blockchain. There is typically one ledger per channel. Each peer node maintains a copy of the ledger for each channel of which they are a member.

A chain is an entry log, which is structured as hash-linked blocks, and each block contains a sequence of N entries, where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Because the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log, it can therefore be regenerated from the chain at any time. The state database may automatically be recovered (or generated if needed) upon peer node startup, and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a way for providing a vehicle service to a particular vehicle and/or requesting user associated with a user profile that is applied to the vehicle. For example, a user may be the owner of a vehicle or the operator of a vehicle owned by another party. The vehicle may require service at certain intervals and the service needs may require authorization prior to permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more sensors, which report sensed data to a central controller computer device in the vehicle, which in turn, is forwarded to a management server for review and action.

A sensor may be located on one or more of the interior of the transport, the exterior of the transport, on a fixed object apart from the transport, and on another transport near to the transport. The sensor may also be associated with the transport's speed, the transport's braking, the transport's acceleration, fuel levels, service needs, the gear-shifting of the transport, the transport's steering, and the like. The notion of a sensor may also be a device, such as a mobile device. Also, sensor information may be used to identify whether the vehicle is operating safely and whether the occupant user has engaged in any unexpected vehicle conditions, such as during the vehicle access period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., company, agency, etc.) may want to limit the exposure of private information, and therefore the blockchain and its immutability can limit the exposure and manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a "consensus" approach associated with the blockchain. Such an approach could not be implemented on a traditional centralized database.

Every autonomous driving system is built on a whole suite of software and an array of sensors. Machine learning, lidar projectors, radar, and ultrasonic sensors all work together to create a living map of the world that a self-driving car can navigate. Most companies in the race to full autonomy are relying on the same basic technological foundations of lidar+radar+cameras+ultrasonic, with a few notable exceptions.

In another embodiment, GPS, maps and other cameras and sensors are used in autonomous vehicles without lidar as lidar is often viewed as being expensive and unnecessary. Researchers have determined that stereo cameras are a low-cost alternative to the more expensive lidar functionality.

The instant application includes, in certain embodiments, authorizing a vehicle for service via an automated and quick authentication scheme. For example, driving up to a charging station or fuel pump may be performed by a vehicle operator and the authorization to receive charge or fuel may be performed without any delays provided the authorization is received by the service station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the transport and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record.

When an occupant (referred to as the initial occupant) is in a transport that becomes inoperable, a system in accordance with the present disclosure allows for alternate transportation to the initial destination. For example, assuming that the first occupant is in an autonomous transport. The autonomous transport then ceases to be operable. This may be due to any number of occurrences, such as lack of fuel/charge, an accident, a mechanical issue, etc.

At this point, the system instructs at least one alternate transport (e.g. autonomous) to navigate to the first occupant. The first occupant can then enter an alternative transport. Additionally, the original navigation directions are transferred from the original transport to the alternative transport, allowing for the first occupant to continue to the initial destination.

In some embodiments, the system automatically detects that the original transport ceases to be operable, instructs the at least one alternate transport to navigate to the first occupant. The alternative transport(s) may be those transports that: are currently on the same path as the original transport; have the same or similar destination as the initial destination of the first occupant; are without any other occupants; or have other occupants that are traveling to the same or similar destination as the initial destination of the first occupant.

The system automatically determines when the first occupant enters an alternative transport. The system automatically instructs the alternative transport to route to the initial destination of the first occupant.

FIG. 1A shows an example system 100A for automatic alternate transportation at a time $t_1$, according to example embodiments. Referring to FIG. 1A, a processor 110 within a management server 102 is able to wirelessly communicate, by way of a wireless network 104, with a processor 112 within a transport 106 and with a processor 114 within a transport 108. A person 116 desires to be transported from a location A to an intended destination at location B. In this example, person 116 becomes a passenger in transport 106 at location A, wherein transport 106 will travel along a navigational path 118 to transport person 116 from location A to location B.

The transport 106 has parameters that are configured in a particular manner, while the person 116 is therein and not therein. Non-limiting parameters for configuration while the person is therein include the seat position, the seat temperature, the seat location, infotainment options, the ambient temperature, a number of predetermined stops prior to the intended destination at location B, etc. Non-limiting parameters for configuration while the person is not therein include the transport type, a make of the transport, a model of the transport, a year of the transport, number of miles driven by the transport, condition of the transport, maintenance associated with a transport, etc. In some embodiments, the processor 110 of the management server 102 configures all the parameters of the transport 106 by way of the wireless network 104 so as to provide a specific travel experience for person 116. In some embodiments, the processor 110 of the management server 102 may configure at least one of the parameters of the transport 106 by way of the wireless network 104, whereas the transport 106 enables the user, for example by way of a graphic user interface (GUI—not shown), to configure other parameters of the transport 106 (or to configure all parameters of the transport), so as to provide a specific travel experience for person 116.

Figure 1B:
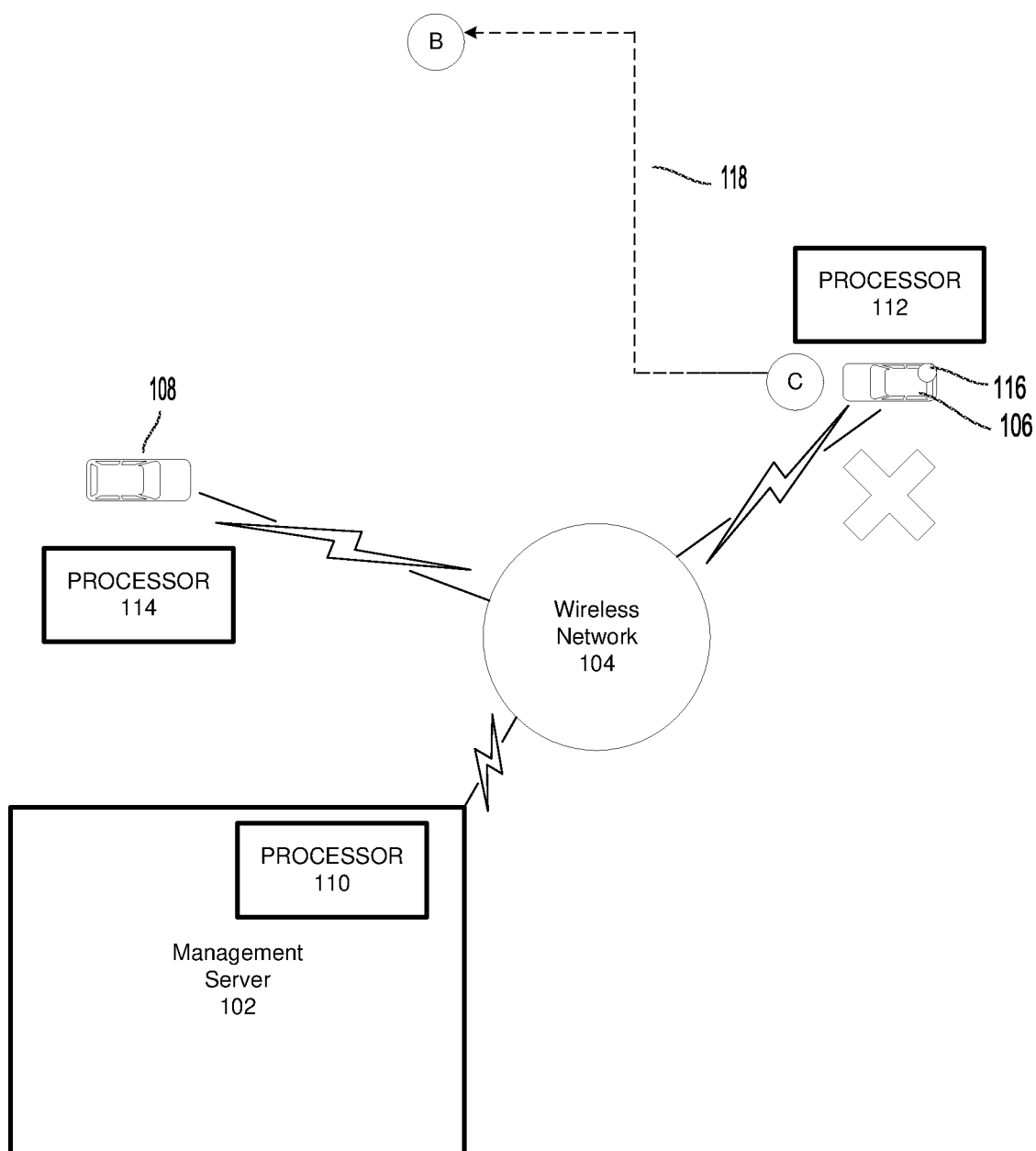
FIG. 1B shows the example system of FIG. 1A for automatic alternate transportation at a time $t_2$, according to example embodiments.

FIG. 1B shows the example system 100B for automatic alternate transportation at a time $t_2$, according to example embodiments. Referring to FIG. 1B, transport 106 has become inoperable at location C along navigational path 118, prior to arriving at location B. The processor 112 sends a message to the processor 110 indicating that transport 106 has become inoperable as well as, in some embodiments a type of issue(s) that cause the inoperability, the location C, the intended destination at location B, and time constraints associated with reaching location B. In anticipation that person 116, who is stranded with the inoperable transport 106 at location C, will want supplemental transportation from location C to location B, the processor 110 of management server 102 instructs the processor 114 of transport 108 to travel to location C to pick up person 116 and transport person 116 from location C to location B. Further, the processor 110 configures transport 108 in a manner as similar as possible to the configuration of transport 106, so as to provide a travel experience that is consistent with the travel experience of transport 106 at time $t_1$ for person 116, as will be discussed in more detail below.

In accordance with aspects of the present disclosure, the configuring of the transport 108 based on a configuration of the transport 106 may include configuring a parameter of the transport 108 from a group of parameters consisting of seat position, seat temperature, seat location, an infotainment option, ambient temperature, a number of predetermined stops prior to the intended destination, the transport type, a make of the transport, a model of the transport, a year of the transport, number of miles driven by the transport, condition of the transport, maintenance associated with a transport, etc. For example, when the transport 106 becomes inoperable, the server 102 may determine the configuration of the transport 106, including the reclined angle of the seat for which the occupant 116 is sitting, the ambient temperature within the transport 106, the seat temperature of the transport 106 and the music provided by the infotainment system of the transport 106. The server 102 may then cause the transport 108 to similarly configure at least one of the reclined angle of the seat, ambient temperature, seat temperature and the music provided by the infotainment system to that of the transport 106, when the transport 108 arrives at location C to pick up the occupant 116. Accordingly, the occupant 116 may be able to attain a consistent riding experience in the transport 108 as to that of the transport 106 prior to the transport 106 becoming inoperable.

In some embodiments, the server 102 may determine the configuration of the transport 106 by wirelessly communicating via the wireless network 104. In some embodiments, the server 102 may periodically ping the transport 106, via the wireless network 104, for updates on the configuration of the transport 106. For example, the processor 112 in the transport 106 may have a memory therein, which stores information related to the configuration of the transport 106. When the processor 112 receives the ping from the server 102, the processor 112 may transmit the stored information related to the configuration of the transport 106 to the server 102 via the wireless network 104. If the configuration of the transport 106 changes, e.g., the occupant 116 changes a music station on the infotainment system, then the information related to the configuration of the transport will be updated in the memory of the processor 112. Accordingly, when the processor 112 transmits the stored information related to the configuration of the transport 106 at any time, the stored information is the most current state of the configuration of the transport 106.

In some embodiments, the transport 106 may periodically provide, via the wireless network 104, updates on the configuration of the transport 106 to the server 102, without a need for a ping from the server 102. For example, the processor 112 in the transport 106 may have a memory therein, which stores information related to the configuration of the transport 106. The processor 112 may transmit the stored information related to the configuration of the transport 106 to the server 102 via the wireless network 104 at preset times or at predetermined intervals. If the configuration of the transport 106 changes, then the information related to the configuration of the transport will be updated in the memory of the processor 112. Accordingly, when the processor 112 transmits the stored information related to the configuration of the transport 106 at any time, the stored information is the most current state of the configuration of the transport 106. In some alternate embodiment, when the transport 106 periodically provides, via the wireless network 104, updates on the configuration of the transport 106 to the server 102, without a need for a ping from the server 102, the transport 106 provides only changes to the configuration as compared to the most recent update that had been sent to the server 102. For example, suppose for purposes of explanation that the transport 106 were to send an initial message of the configuration of the transport 106 to server 102 via the wireless network 104. Then, after the initial message is sent, the occupant changes the channel on the infotainment system in order to listen to different music. In this situation, for this type of alternate embodiment, the information related to the change in the configuration of the transport will be updated in the memory of the processor 112. Accordingly, the processor 112 transmits the stored change in information related to the configuration of the transport 106, which reflects the most current state of the configuration of the transport 106, to server 102 via the wireless network 104.

In some embodiments, the transport 106 may provide, via the wireless network 104, an update on the configuration of the transport 106 to the server 102, when the transport 106 becomes inoperable. For example, the processor 112 in the transport 106 may have a memory therein, which stores information related to the configuration of the transport 106. When the transport 106 becomes inoperable, the processor 112 may transmit the stored information related to the configuration of the transport 106 to the server 102 via the wireless network 104. If the configuration of the transport 106 changes, then the information related to the configuration of the transport will be updated in the memory of the processor 112. Accordingly, when the processor 112 transmits the stored information related to the configuration of the transport 106 at any time, the stored information is the most current state of the configuration of the transport 106.

In some embodiments, the server 102 may ping the transport 106, via the wireless network 104, for updates on the configuration of the transport 106, when the transport 106 becomes inoperable. For example, when transport 106 becomes inoperable, the processor 112 in the transport may transmit a message to the processor 110 of the management server, by way of the wireless network 104, wherein the message indicates that the transport 106 is inoperable. The processor 110 of the management server 102 may then ping the processor 112 of the transport 106, by way of the wireless network 104, for configuration information of the transport 106. The processor 112 in the transport 106 may have a memory therein, which stores information related to the configuration of the transport 106. When the processor 112 receives the ping from the processor 110 of the management server 102, the processor 112 may transmit the stored information related to the configuration of the transport 106 to the server 102 via the wireless network 104. If the configuration of the transport 106 changes, then the information related to the configuration of the transport will be updated in the memory of the processor 112. Accordingly, when the processor 112 transmits the stored information related to the configuration of the transport 106 at any time, the stored information is the most current state of the configuration of the transport 106.

In some embodiments, when configuration information of the transport 106 is provided to the server 102, additional information may also be provided. Such additional information may include diagnostic information related to why transport 106 is inoperable, location information of transport 106, intended destination information, as well as other information such as the number of occupants in the transport 106, the number of articles travelling with the occupants in the transport 106, the seating configuration in transport 106, etc.

In a non-limiting example embodiment, the routing of the alternate transport 108 comprises transferring, by the server 102, the routing of the intended destination of the transport 106 to the alternate transport 108. This may be performed by non-limiting examples of which include: the server 102 retrieving the previously stored intended destination and transmitting such previously stored intended destination to the alternate transport 108 by wireless network 104, the server 102 instructing the transport 106 to transmit the intended destination to the server 102 by wireless network 104, wherein the server 102 will then transmit the received intended destination to the alternate transport 108 by the wireless network 104, and the server 102 instructing the transport 106 to transmit the intended destination to the alternate transport 108, wherein the transport 106 will then transmit the intended destination to the alternate transport 108 by the wireless network 104.

In a non-limiting example embodiment, the configured alternate transport 108 and the transport 106 are on a same or similar navigational path. For example, the transport 106 and the transport 108 may be common carriers that have a similar predetermined daily navigational path, or route.

If a passenger within the transport 106 wants to know when the alternate transport 108 will arrive at the location of the inoperable transport 106, then in accordance with aspects of the present disclosure, the transport 106 may provide an estimated time of arrival of the alternate transport 108 to the passenger. In particular, in some embodiments, the instant solution may include determining, by the server 102, a transport location of the transport 106. This may be performed by a Global Positioning System (GPS), or other location systems, wherein the transport 106 includes a GPS that provides the location of the transport 106 to the server 102. The instant solution may additionally include determining, by the server 102, an alternate transport location of the alternate transport 108. This may be a GPS, wherein the alternate transport 108 includes a GPS that provides the alternate transport location of the alternate transport 108 to the server 102. The instant solution may additionally include determining, by the server 102, an estimated time of arrival of the alternate transport 108 to the transport location based on the transport location and the alternate transport location. This may be performed by a navigation system, wherein the server 102 is operable to determine an estimated time of arrival based on parameters, non-limiting examples of which include navigational paths of travel, speed limits along the navigational paths of travel, traffic flow along the navigational paths of travel, and combinations thereof. The method may additionally include providing, by the server 102 to the transport 106, the estimated time of arrival of the alternate transport 108. This may be performed by wireless network 104. The method may additionally include providing, via a graphic user interface within the transport 106, the estimated time of arrival of the alternate transport 108.

Figure 1C:
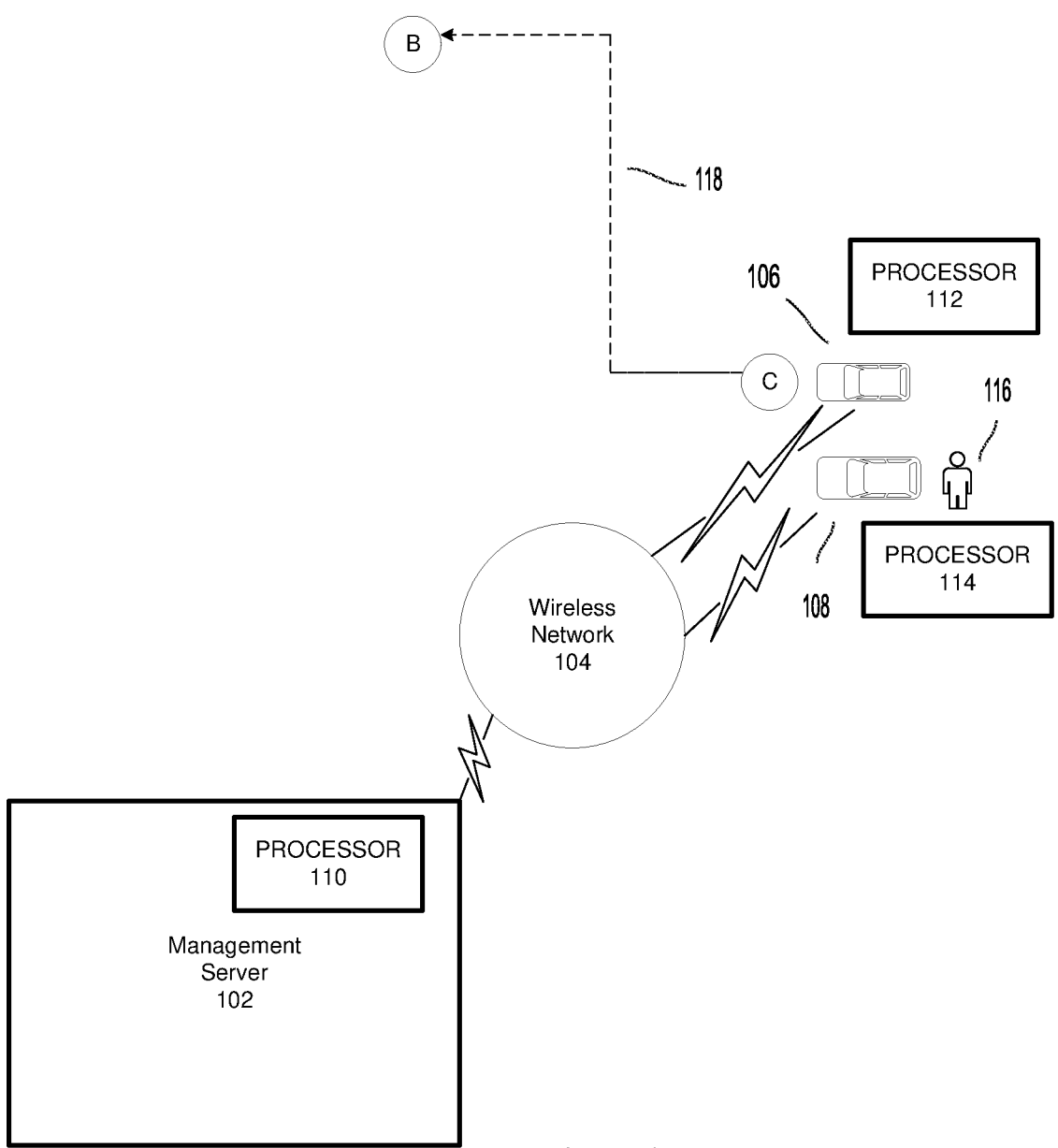
FIG. 1C shows the example system of FIG. 1A for automatic alternate transportation at a time $t_3$, according to example embodiments.

FIG. 1C shows the example system 100C for automatic alternate transportation at a time $t_3$, according to example embodiments. Referring to FIG. 1C, transport 108 has arrived at location C with transport 106, wherein person 116 has disembarked from transport 106 so as to use transport 108. At this point in time, transport 108 has been configured in a manner similar to the configuration of transport 106, so as to provide a travel experience that is consistent with the travel experience of transport 106 between time $t_1$ (of FIG. 1A) and time $t_2$ (of FIG. 1B).

In some embodiments, when configuration information of the transport 106 is received by the server 102, the server 102 transmits the configuration information to the processor 114 of transport 108, for example by way of wireless network 104. The processor 114 of transport 108 may then configure at least one of the reclined angle of the seat, ambient temperature, seat temperature, the music provided by the infotainment system, etc., to that of the transport 106, based on the configuration information received from the server 102.

Figure 1D:
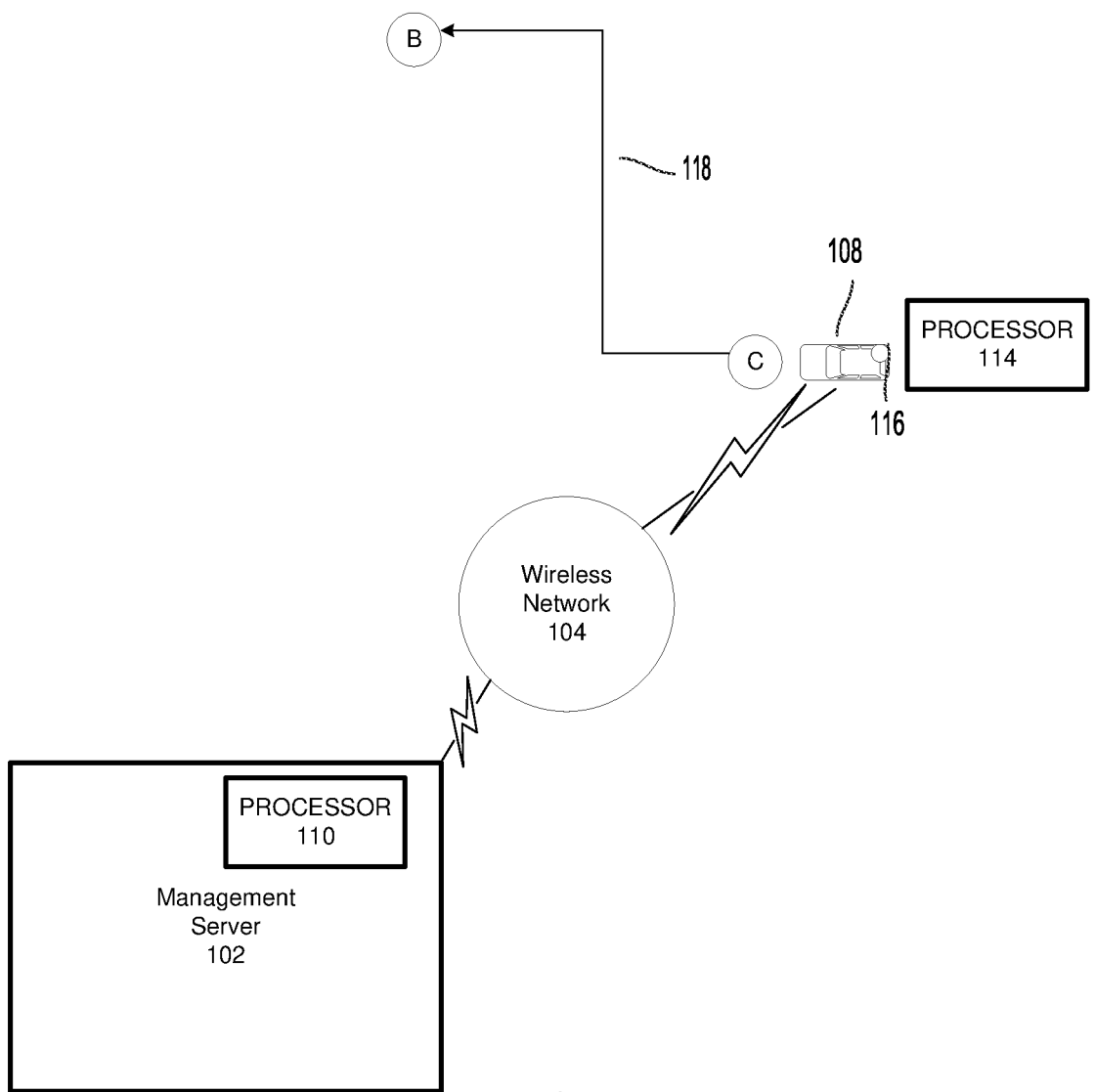
FIG. 1D shows the example system of FIG. 1A for automatic alternate transportation at a time $t_4$, according to example embodiments.

FIG. 1D shows the example system 100D for automatic alternate transportation at a time $t_4$, according to example embodiments. Referring to FIG. 1D, person 116 has boarded transport 108, and will continue to travel to destination B with a consistent travel experience. Further, in some embodiments, the transport 108 may additionally operate in a manner similar to the transport 106, as discussed above with reference to FIG. 1A, with respect to providing configuration information to the server 102. Accordingly, if the transport 108 becomes inoperable prior to arriving at destination B, the method of automatically providing alternate transportation may be repeated with yet another alternate transport.

In some embodiments, a plurality of alternate transports may be provided as options for a user. Further, in some embodiments, no single alternate transport may be identically configured to the inoperable transport. Accordingly, the passenger of the inoperable transport may be able to choose the most appealing alternate transport from a provided list of optional alternate transports, based on available parameter information of the optional alternate transports. This will be described with reference to FIGS. 2A-2D.

Figure 2A:
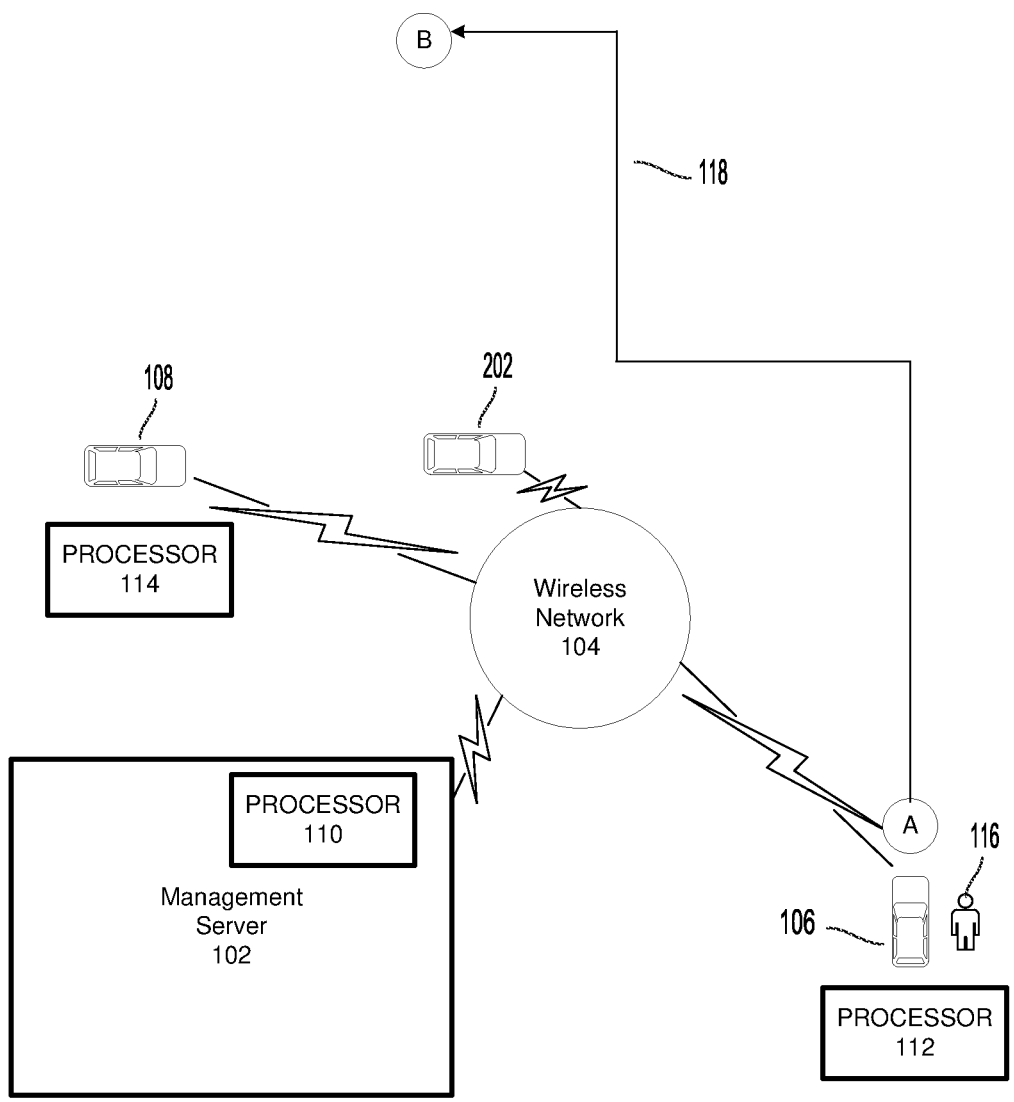
FIG. 2A illustrates an example system for automatic alternate transportation at a time $t_5$, according to example embodiments.

FIG. 2A illustrates an example system 200A for automatic alternate transportation at a time $t_5$, according to example embodiments. Referring to FIG. 2A, system 200A includes all the elements of system 100A of FIG. 1A, with the addition of transport 202. Again, in this example, person 116 desires to be transported from a location A to an intended destination at location B. In this example, person 116 becomes a passenger in transport 106 at location A, wherein transport 106 will travel along a navigational path 118 to transport person 116 from location A to location B.

Figure 2B:
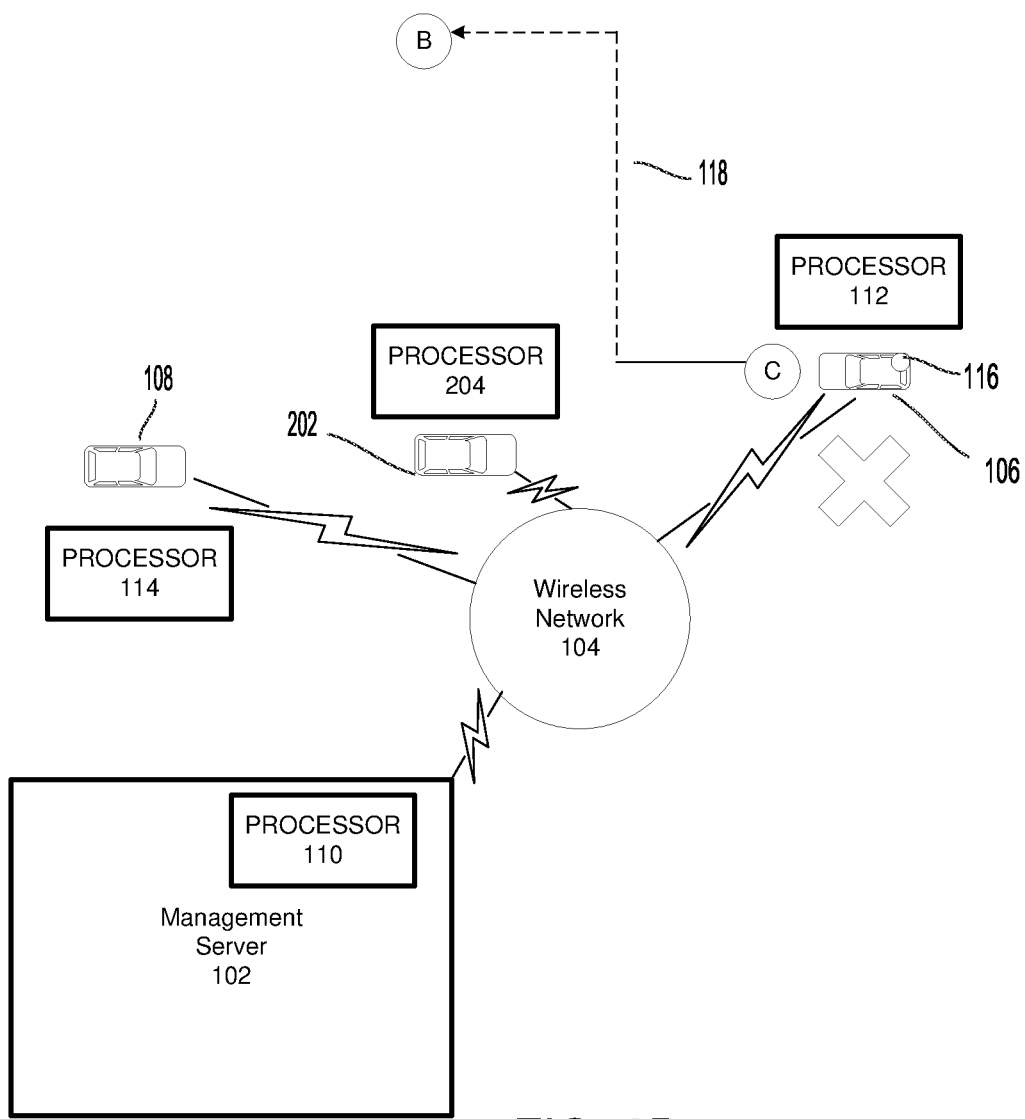
FIG. 2B shows the example system of FIG. 2A for automatic alternate transportation at a time $t_6$, according to example embodiments.

FIG. 2B shows the example system 200B for automatic alternate transportation at a time $t_6$, according to example embodiments. Referring to FIG. 2B, the transport 106 has become inoperable at location C along the navigational path 118, prior to arriving at location B. The processor 112 sends a message to the processor 110 indicating that the transport 106 has become inoperable as well as, in some embodiments a type of issue(s) that cause the inoperability, the location C, the intended destination at location B, time constraints associated with reaching location B. In this example, the processor 110 of the management server 102 may provide the processor 112 of the transport 106 with information of each of the transport 108 and the transport 202. For purposes of discussion only, in this example, let the transport 108 not be configurable in a manner that exactly mimics the travel experience of the transport 106. For example, let the transport 108 be unable to configure the inclination of the seat therein to the same inclination of the seat of the transport 106. Further, let the transport 202 also not be configurable in a manner that exactly mimics the travel experience of the transport 106. For example, let the transport 202 be unable to configure the infotainment system therein to the same movie that was playing in transport 106. The processor 110 of the management server 102 may provide the information by wireless network 104. By providing information of each of the transport 108 and the transport 202 to transport 106, the person 116 may choose one of the transport 108 and the transport 202 to continue traveling to destination location B. The person 116 may choose a transport by way of a graphic user interface in the transport 106.

In this example, let the person 116 choose to use the transport 202. In such a case, the processor 112 of transport 106 may inform the processor 110 of management server 102, via the wireless network 104, of the choice to use transport 202 to continue to destination location B. The processor 110 of management server 102 may instruct the processor 204 of transport 202, via the wireless network 104, to travel to location C to pick up person 116 and transport person 116 from location C to location B. Further, the processor 110 configures transport 202 in a manner similar to the configuration of transport 106, so as to provide a travel experience that is consistent with the travel experience of transport 106 at time $t_1$ for person 116.

Figure 2C:
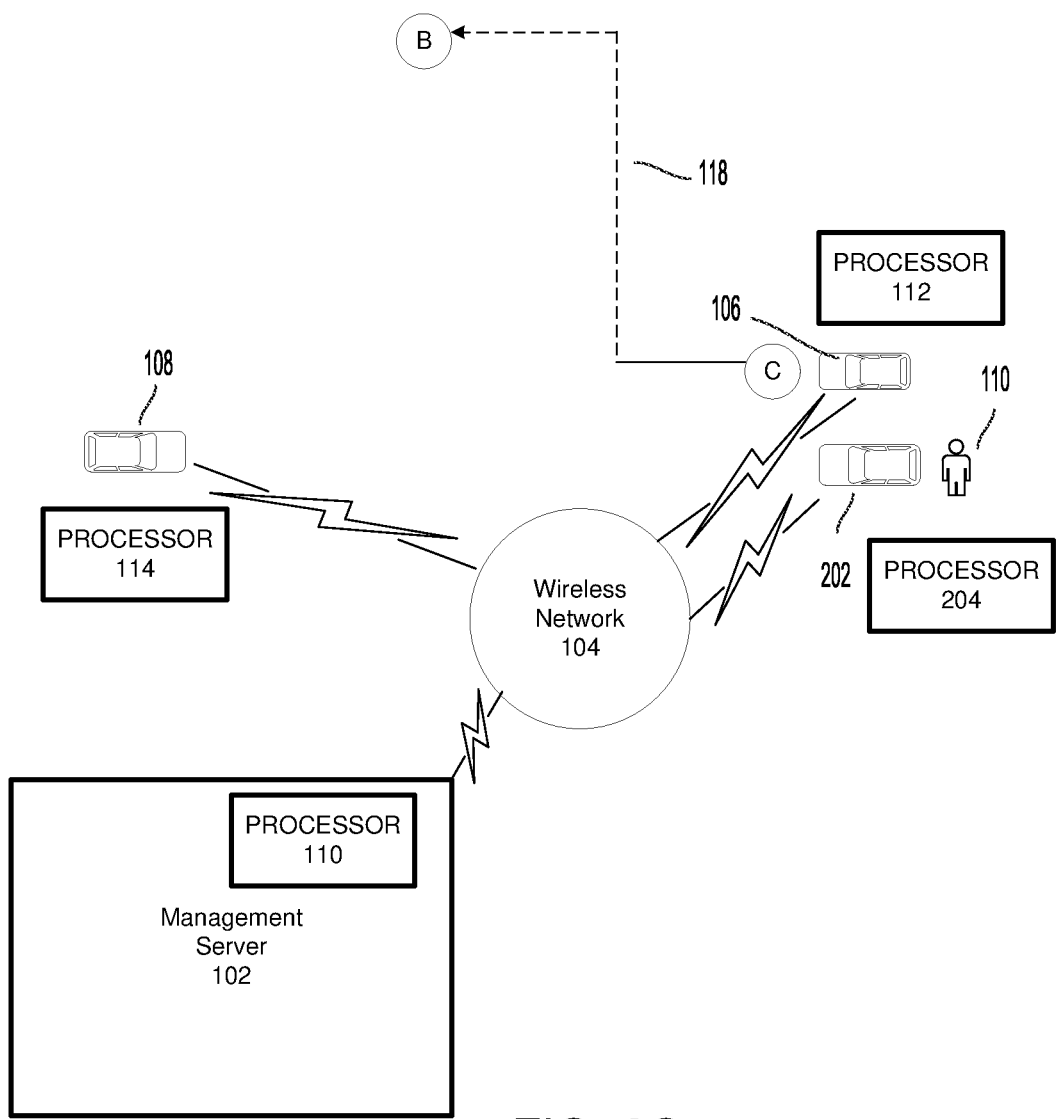
FIG. 2C shows the example system of FIG. 2A for automatic alternate transportation at a time $t_7$, according to example embodiments.

FIG. 2C shows the example system 200C for automatic alternate transportation at a time $t_7$, according to example embodiments. Referring to FIG. 2C, transport 202 has arrived at location C with transport 106, wherein person 116 has disembarked from transport 106 so as to use transport 202. At this point in time, transport 202 has been configured in a manner similar to the configuration of transport 106, but not playing the same movie. Therefore, the person is provided with a travel experience that is as consistent as possible based on the available alternate transports.

Figure 2D:
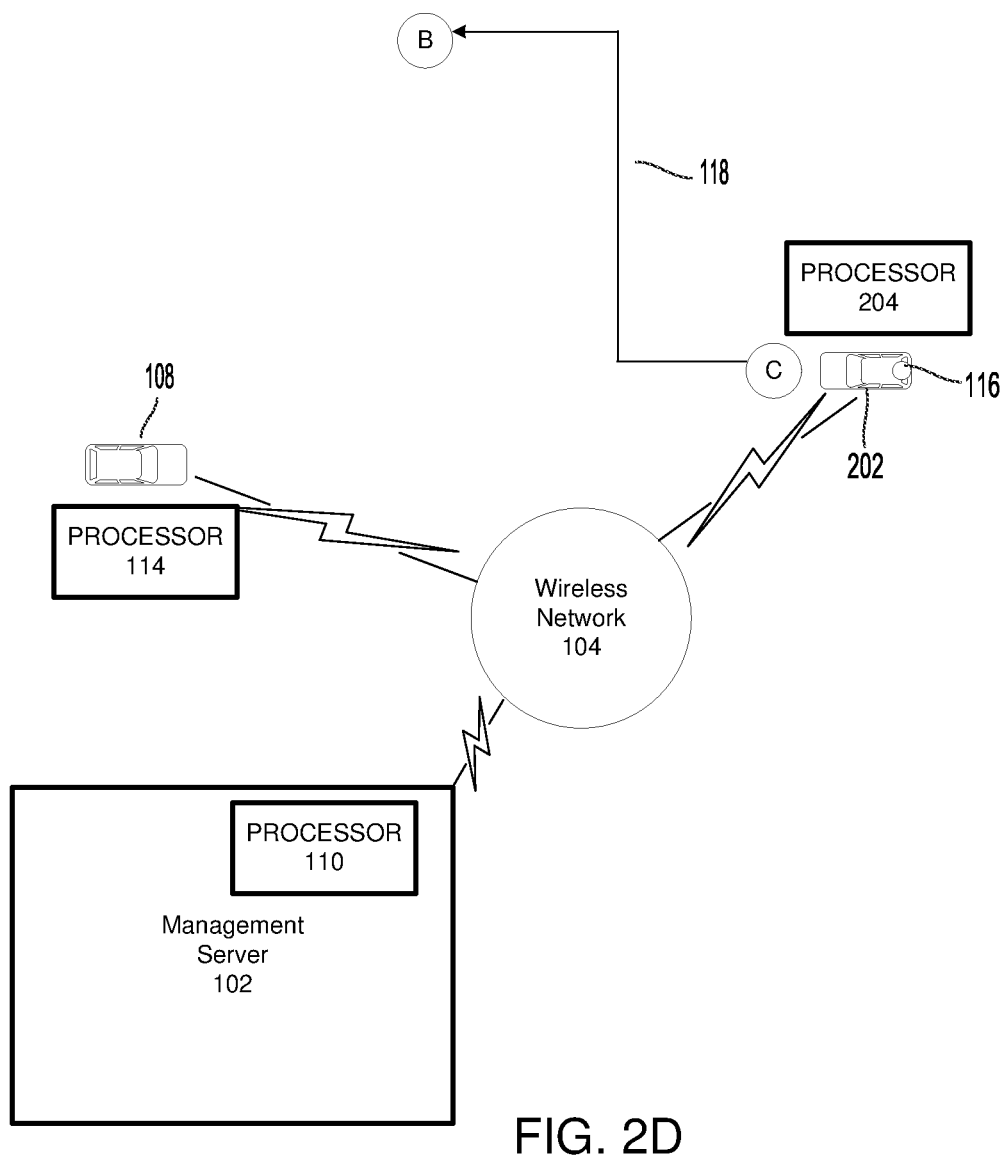
FIG. 2D shows the example system of FIG. 2A for automatic alternate transportation at a time $t_8$, according to example embodiments.

FIG. 2D shows the example system 200D for automatic alternate transportation at a time $t_8$, according to example embodiments. Referring to FIG. 2D, person 116 has boarded transport 108, and will continue to travel to destination B with a consistent travel experience.

In some embodiments, a plurality of alternate transports may be optionally directed to the transport location in order to provide a passenger alternate transport options. For example, one of the plurality of alternate transports might be able to transport the passenger from the location C, as shown in FIG. 1C, to a location that is not location B, but is close to location B. In this manner, the passenger may choose an alternate final destination based on the provided options of alternate transports. This example embodiment may be particularly suited to autonomous mass transit transports that transport more than one person at a time. In such cases, the autonomous mass transit transport may not go to location B, but may go to location C that is sufficiently close to location B for the stranded person in the inoperable transport.

Figure 3A:
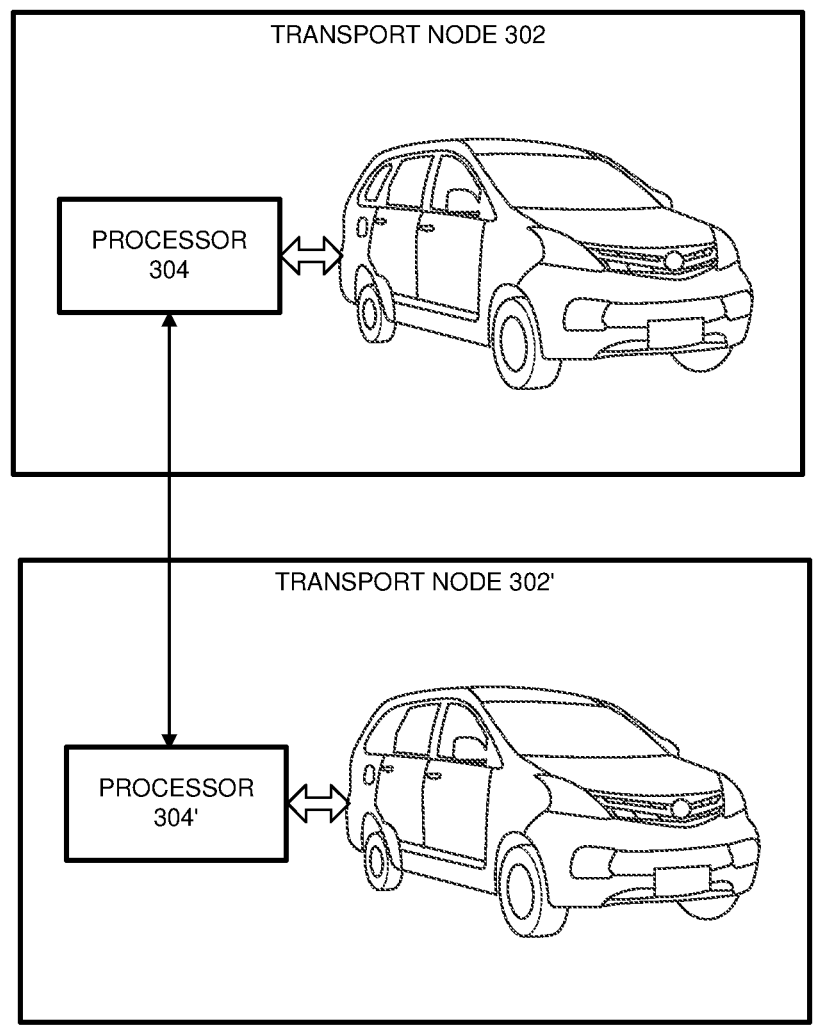
FIG. 3A illustrates a transport network diagram, according to example embodiments.

FIG. 3A illustrates a transport network diagram 300, according to example embodiments. The network comprises elements including a transport node 302 including a processor 304, as well as a transport node 302' including a processor 304'. The transport nodes 302, 302' communicate with one another via the processors 304, 304', as well as other elements (not shown) including transceivers, transmitters, receivers, storage, sensors and other elements capable of providing communication. The communication between the transport nodes 302, 302' can occur directly, via a private and/or a public network (not shown) or via other transport nodes and elements comprising one or more of a processor, memory, and software. Although depicted as single transport nodes and processors, a plurality of transport nodes and processors may be present. One or more of the applications, features, steps, solutions, etc., described and/or depicted herein may be utilized and/or provided by the instant elements.

Figure 3B:
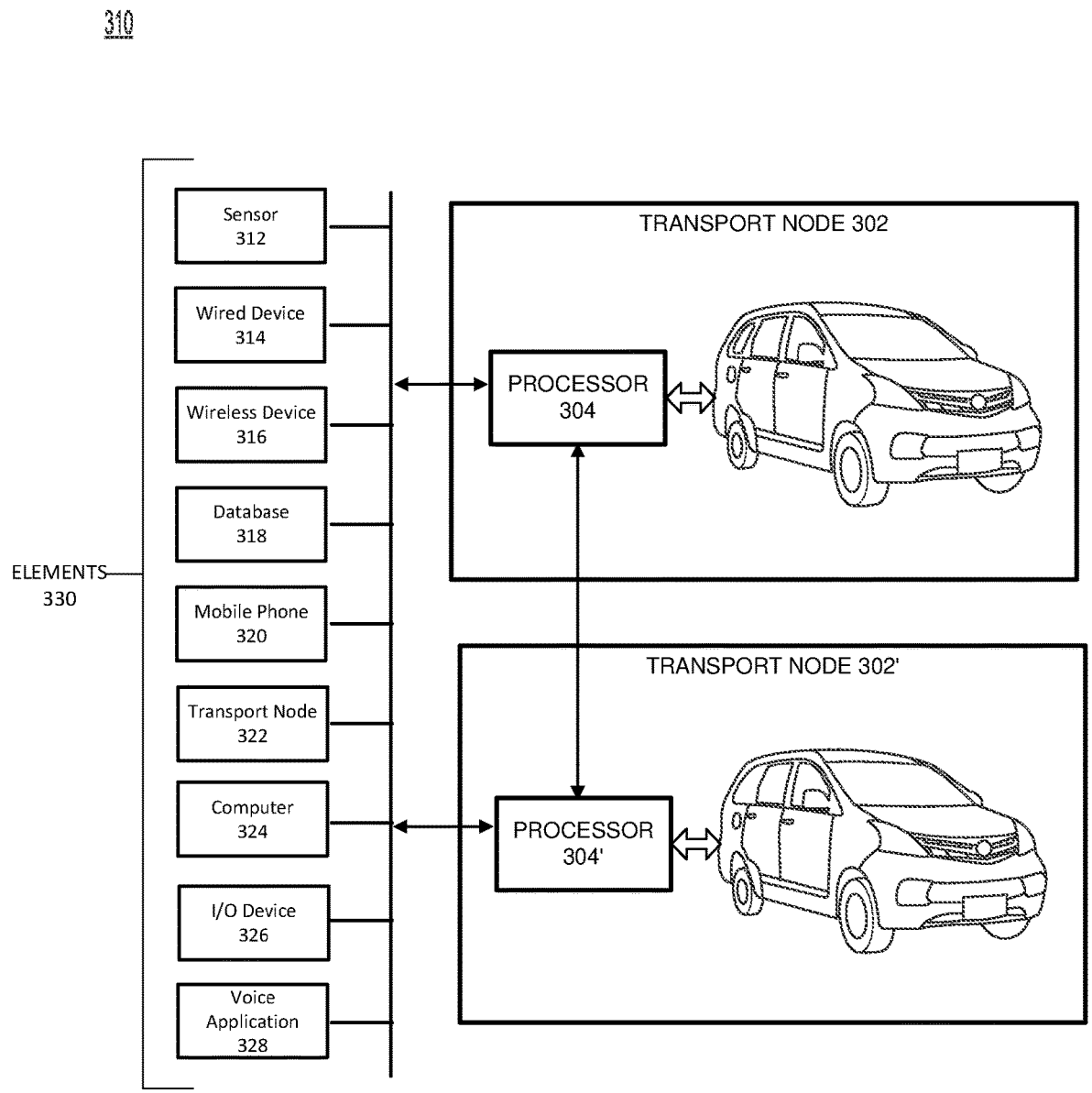
FIG. 3B illustrates another transport network diagram, according to example embodiments.

FIG. 3B illustrates another transport network diagram 310, according to example embodiments. The network comprises elements including a transport node 302 including a processor 304, as well as a transport node 302' including a processor 304'. The transport nodes 302, 302' communicate with one another via the processors 304, 304', as well as other elements (not shown) including transceivers, transmitters, receivers, storage, sensors and other elements capable of providing communication. The communication between the transport nodes 302, 302' can occur directly, via a private and/or a public network (not shown) or via other transport nodes and elements comprising one or more of a processor, memory, and software. The processors 304, 304' can further communicate with one or more elements 330 including sensor 312, wired device 314, wireless device 316, database 318, mobile phone 320, transport node 322, computer 324, I/O device 326 and voice application 328. The processors 304, 304' can further communicate with elements comprising one or more of a processor, memory, and software.

Although depicted as single transport nodes, processors and elements, a plurality of transport nodes, processors and elements may be present. Information or communication can occur to and/or from any of the processors 304, 304' and elements 330. For example, the mobile phone 320 may provide information to the processor 304 which may initiate the transport node 302 to take an action, may further provide the information or additional information to the processor 304' which may initiate the transport node 302' to take an action, may further provide the information or additional information to the mobile phone 320, the transport node 322, and/or the computer 324. One or more of the applications, features, steps, solutions, etc., described and/or depicted herein may be utilized and/or provided by the instant elements.

Figure 3C:
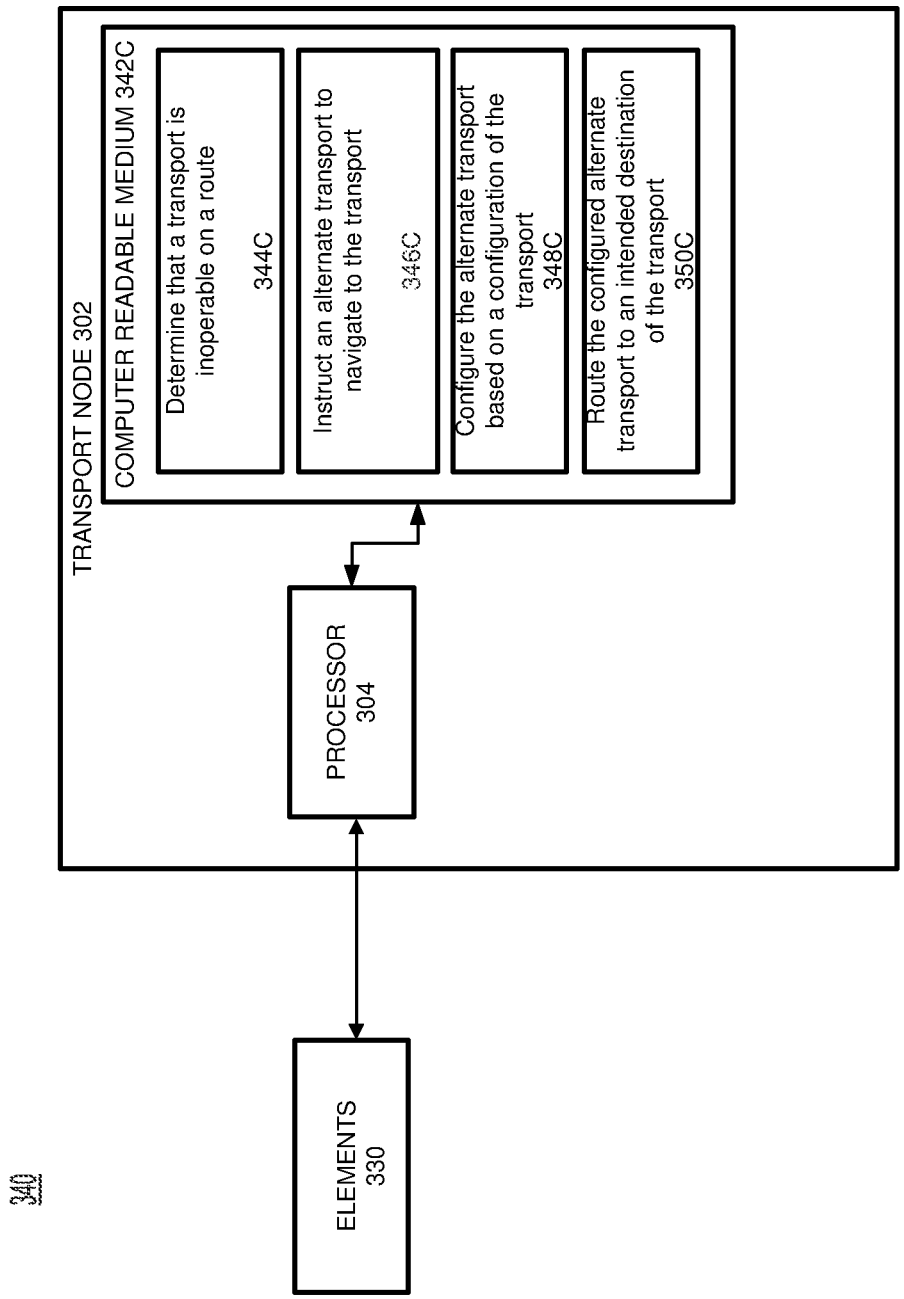
FIG. 3C illustrates yet another transport network diagram, according to example embodiments.

FIG. 3C illustrates yet another transport network diagram 340, according to example embodiments. The network comprises elements including a transport node 302 including a processor 304 and a non-transitory computer readable medium 342C. The processor 304 is communicably coupled to the computer readable medium 342C and elements 330 (which were depicted in FIG. 3B).

The processor 304 performs one or more of determining that a transport is inoperable on a route; instructing an alternate transport to navigate to the transport; configuring the alternate transport based on a configuration of the transport; and routing the configured alternate transport to an intended destination of the transport.

Figure 3D:
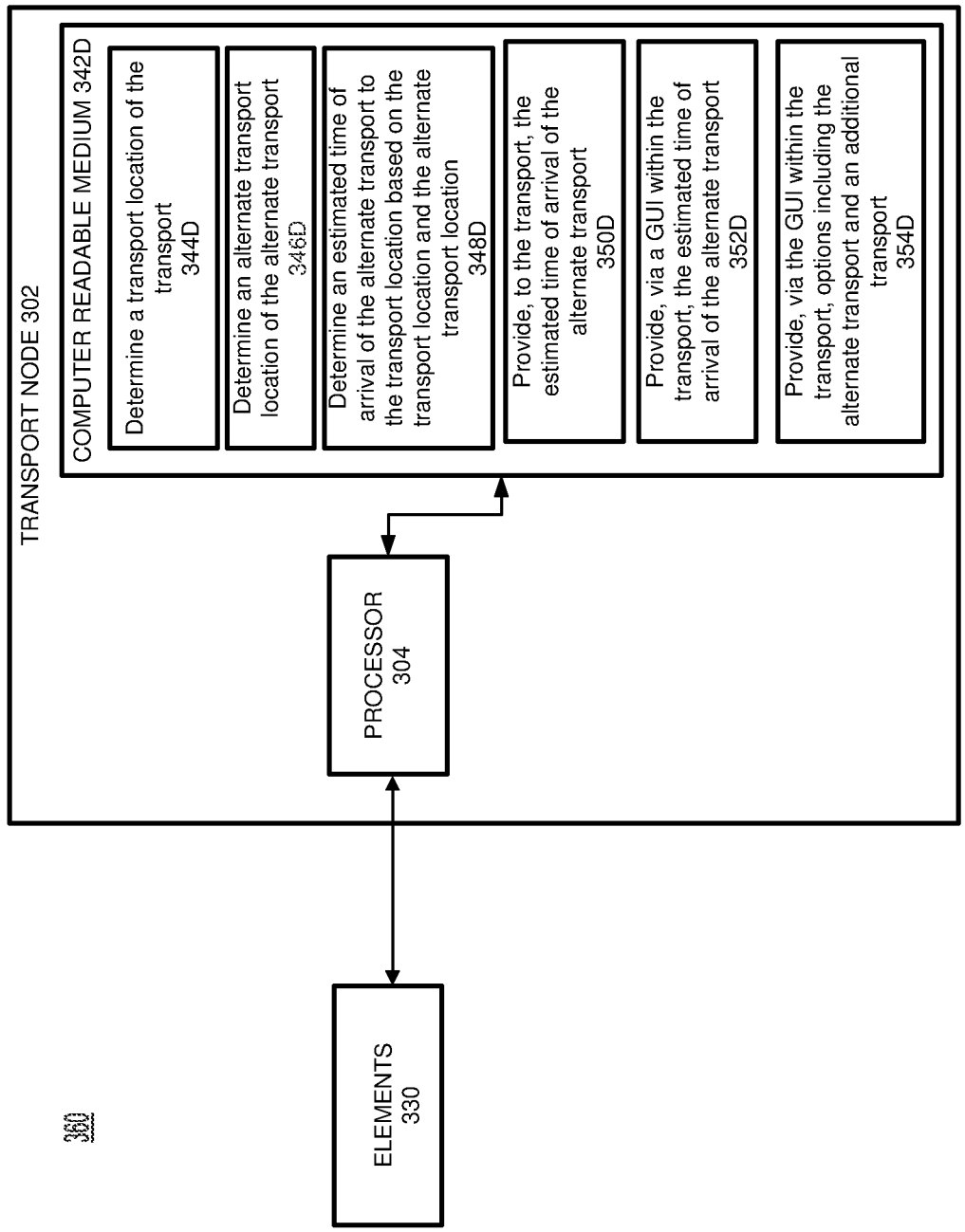
FIG. 3D illustrates a further transport network diagram, according to example embodiments.

FIG. 3D illustrates a further transport network diagram 360, according to example embodiments. The network comprises elements including a transport node 302 including a processor 304 and a non-transitory computer readable medium 342D. The processor 304 is communicably coupled to the computer readable medium 342D and elements 330 (which were depicted in FIG. 3B).

The processor 304 performs one or more of determining that a transport is inoperable on a route; instructing an alternate transport to navigate to the transport; configuring the alternate transport based on a configuration of the transport; and routing the configured alternate transport to an intended destination of the transport.

The processors and/or computer readable media may fully or partially reside in the interior or exterior of the transport nodes. The steps or features stored in the computer readable media may be fully or partially performed by any of the processors and/or elements in any order. Additionally, one or more steps or features may be added, omitted, combined, performed at a later time, etc.

Figure 4A:
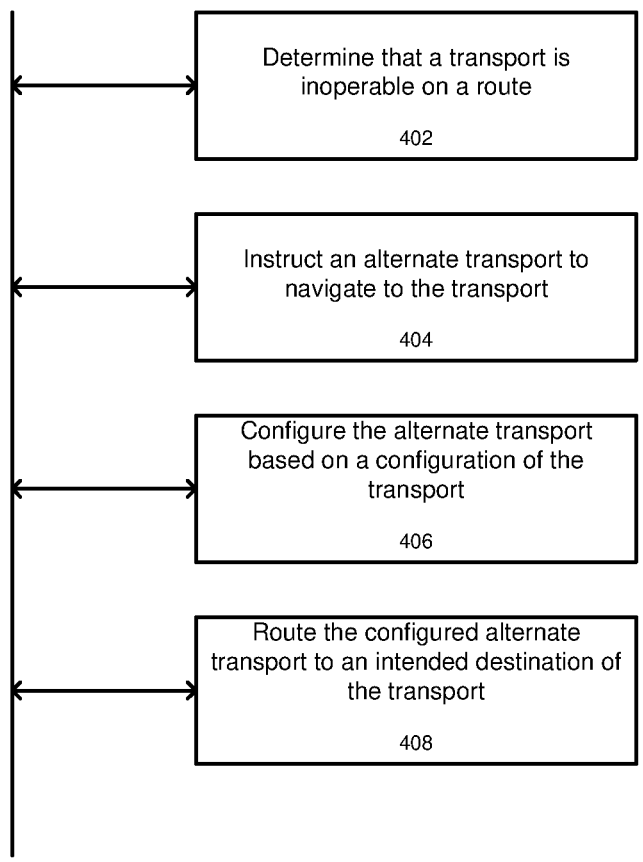
FIG. 4A illustrates a flow diagram, according to example embodiments.

FIG. 4A illustrates a flow diagram 400, according to example embodiments. Referring to FIG. 4A, an example method may be executed by the processor 110 of the management server 102 (see FIG. 1A). It should be understood that method 400 depicted in FIG. 4A may include additional operations and that some of the operations described therein may be removed and/or modified without departing from the scope of the method 400. The description of the method 400 is also made with reference to the features depicted in FIGS. 1B-1D for purposes of illustration. Particularly, the processor 110 of the management server 102 may execute some or all of the operations included in the method 400.

With reference to FIG. 4A, at block 402, the processor 110 may determine that a transport is inoperable on a route, for example as shown with the transport 106 being inoperable at location C along route 118 of FIG. 1B. This determination may be performed by receiving a message from the transport 106 via the wireless network 104, wherein the message indicates that the transport 106 is inoperable on the route, and not receiving an expected message from the transport 106 via the wireless network 104 that the transport 106 remains operable on the route. At block 404, the processor 110 may instruct the alternate transport 108 to navigate to the transport 106 that is inoperable on the route, for example as shown in FIG. 1B. This instruction may be performed transmitting a message to the alternate transport 108 via the wireless network 104. At block 406, the processor 104 may configure the alternate transport 108 based on a configuration of the transport. This configuration may be performed by transmitting a message to the alternate transport 108 via the wireless network 104. At block 408, the processor 104 may route the configured alternate transport 108 to an intended destination of the transport 106, for example as shown at location C of FIG. 1C. This routing may be performed by transmitting a message to the alternate transport 108 via the wireless network 104.

Figure 4B:
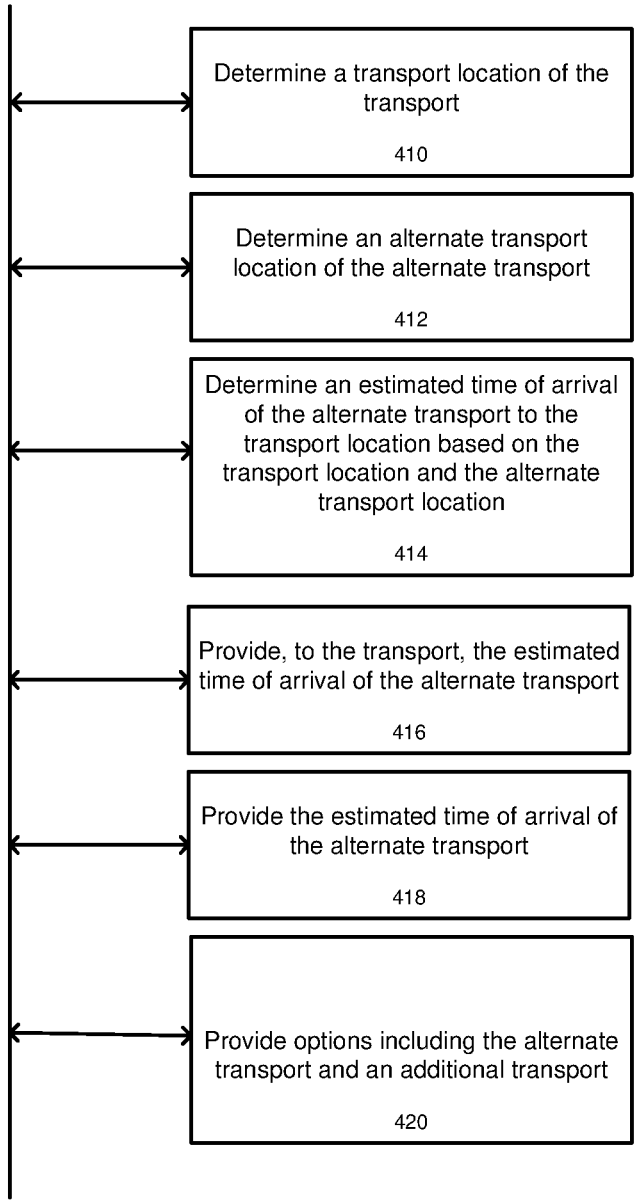
FIG. 4B illustrates another flow diagram, according to example embodiments.

FIG. 4B illustrates another flow diagram 401, according to example embodiments. Referring to FIG. 4B, the method 401 method may be executed by the processor 110 of the management server 102 (see FIG. 1A). It should be understood that method 401 depicted in FIG. 4B may include additional operations and that some of the operations described therein may be removed and/or modified without departing from the scope of the method 401. The description of the method 401 is also made with reference to the features depicted in FIGS. 1B-1D for purposes of illustration. Particularly, the processor 110 of the management server 102 may execute some or all of the operations included in the method 401.

With reference to FIG. 4B, at block 410, the processor 110 may determine a transport location of the transport 106, for example as shown at location C along route 118 of FIG. 1B. This determination may be performed by receiving a GPS message, from the transport 106 via the wireless network 104, wherein the GPS message indicates a location of the transport 106 at location C. At block 412, the processor 110 may determine an alternate transport location of the alternate transport 108, for example as shown in FIG. 1B. This determination may be performed by receiving a GPS message from the alternate transport 108 via the wireless network 104, wherein the GPS message indicates a location of the alternate transport 108. At block 414, the processor 104 may determine an estimated time of arrival of the alternate transport 108 to the transport location based on the transport location and the alternate transport location. This determination may be performed by a GPS navigation system. At block 416, the processor 104 may provide, to the transport 106, the estimated time of arrival of the alternate transport 108. This providing may be performed by transmitting an estimated time of arrival (ETA) message, which is associated with the ETA of the alternate transport 108 to the location of the transport 106, via the wireless network 104 to the transport 106. At block 418, a graphical user interface (GUI) within the transport 106, may provide the estimated time of arrival of the alternate transport 108. At block 420, the GUI within the transport 106 may provide options including the alternate transport and an additional transport. In an alternate embodiment, the estimated time of arrival and/or the options may be provided via audio, video, text, multimedia, projection, image, and the like via one or more processors, memory, sensors (not shown) on the transport.

Figure 5:
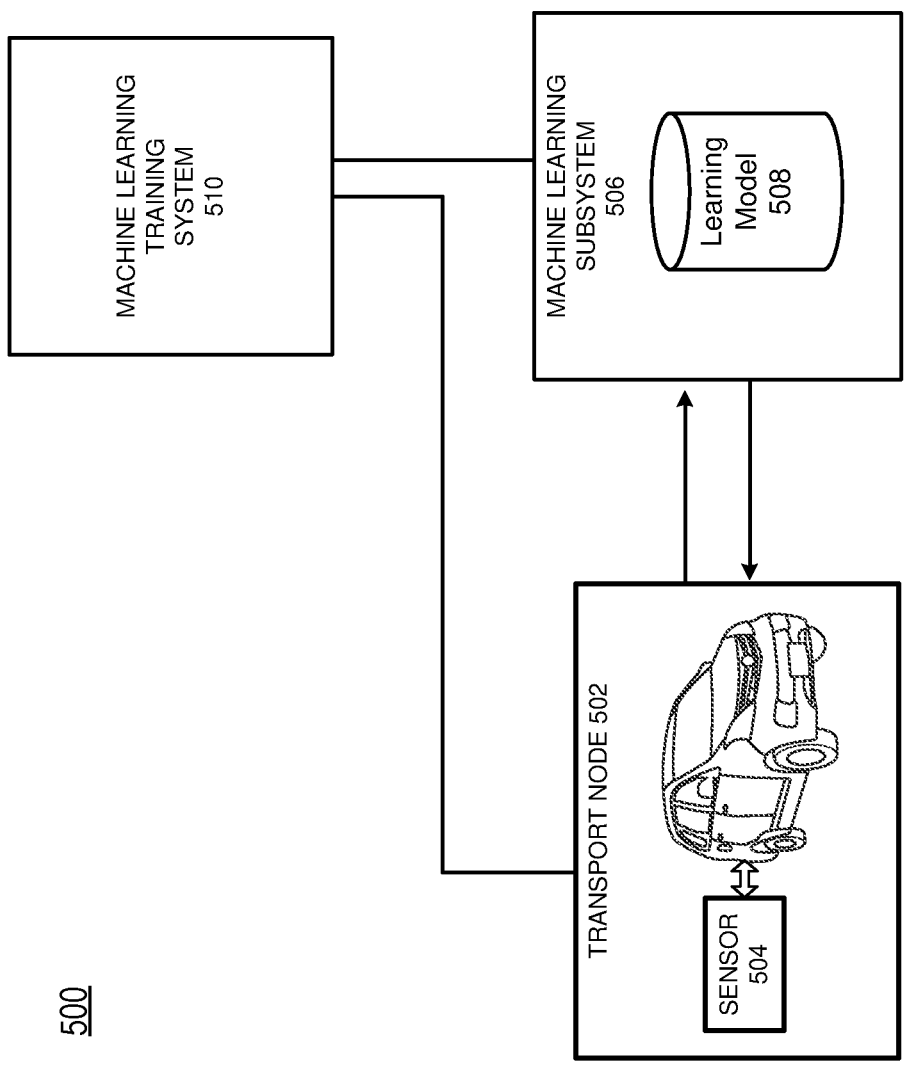
FIG. 5 illustrates a machine learning transport network diagram, according to example embodiments.

FIG. 5 illustrates a machine learning transport network diagram 500, according to example embodiments. The network 500 includes a transport node 502 that interfaces with a machine learning subsystem 506. The transport node includes one or more sensors 504.

The machine learning subsystem 506 contains a learning model 508 which is a mathematical artifact created by a machine learning training system 510 that generates predictions by finding patterns in one or more training data sets. In some embodiments, the machine learning subsystem 506 resides in the transport node 502. In other embodiments, the machine learning subsystem 506 resides outside of the transport node 502.

The transport node 502 sends data from the one or more sensors 504 to the machine learning subsystem 506. The machine learning subsystem 506 provides the one or more sensor 504 data to the learning model 508, which returns one or more predictions. The machine learning subsystem 506 sends one or more instructions to the transport node 502 based on the predictions from the learning model 508.

In a further embodiment, the transport node 502 may send the one or more sensor 504 data to the machine learning training system 510. In yet another embodiment, the machine learning subsystem 506 may sent the sensor 504 data to the machine learning subsystem 510. One or more of the applications, features, steps, solutions, etc., described and/or depicted herein may utilize the machine learning network 500 as described herein.

Figure 6A:
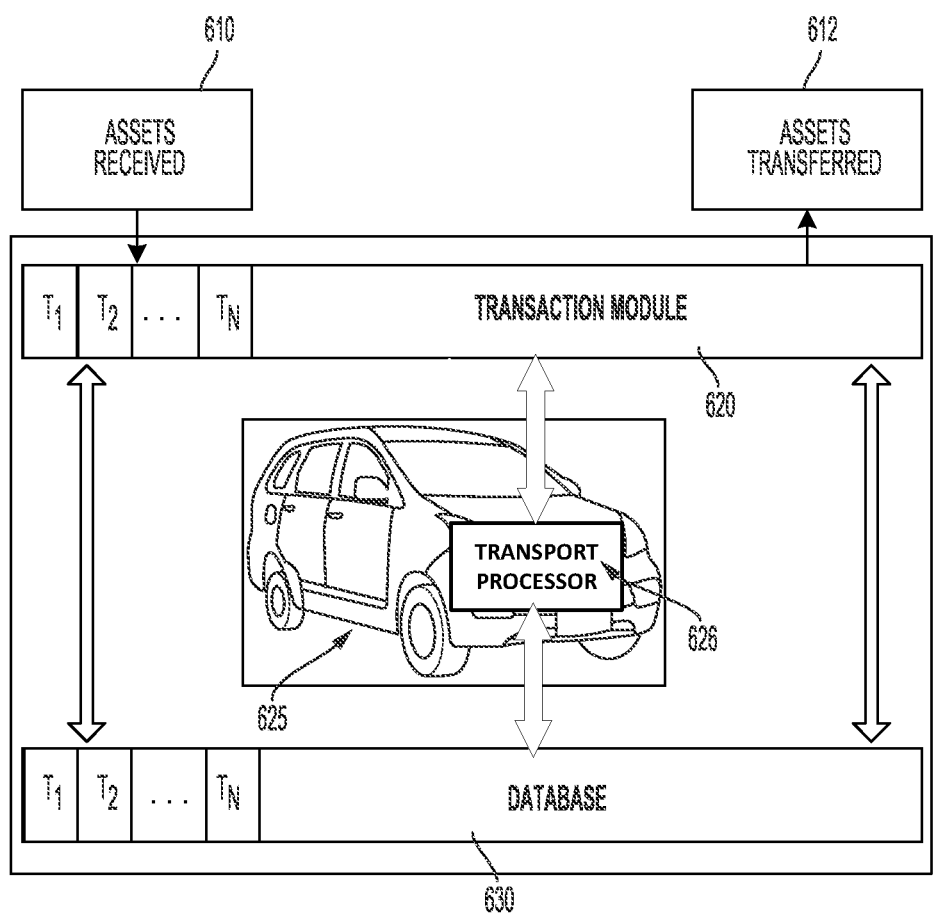
FIG. 6A illustrates an example vehicle configuration for managing database transactions associated with a vehicle, according to example embodiments.

FIG. 6A illustrates an example vehicle configuration 600 for managing database transactions associated with a vehicle, according to example embodiments. Referring to FIG. 6A, as a particular transport/vehicle 625 is engaged in transactions (e.g., vehicle service, dealer transactions, delivery/pickup, transportation services, etc.), the vehicle may receive assets 610 and/or expel/transfer assets 612 according to a transaction(s). A transport processor 626 resides in the vehicle 625 and communication exists between the transport processor 626, a database 630, a transport processor 626 and the transaction module 620. The transaction module 620 may record information, such as assets, parties, credits, service descriptions, date, time, location, results, notifications, unexpected events, etc. Those transactions in the transaction module 620 may be replicated into a database 630. The database 630 can be one of a SQL database, an RDBMS, a relational database, a non-relational database, a blockchain, a distributed ledger, and may be on board the transport, may be off board the transport, may be accessible directly and/or through a network, or be accessible to the transport.

Figure 6B:
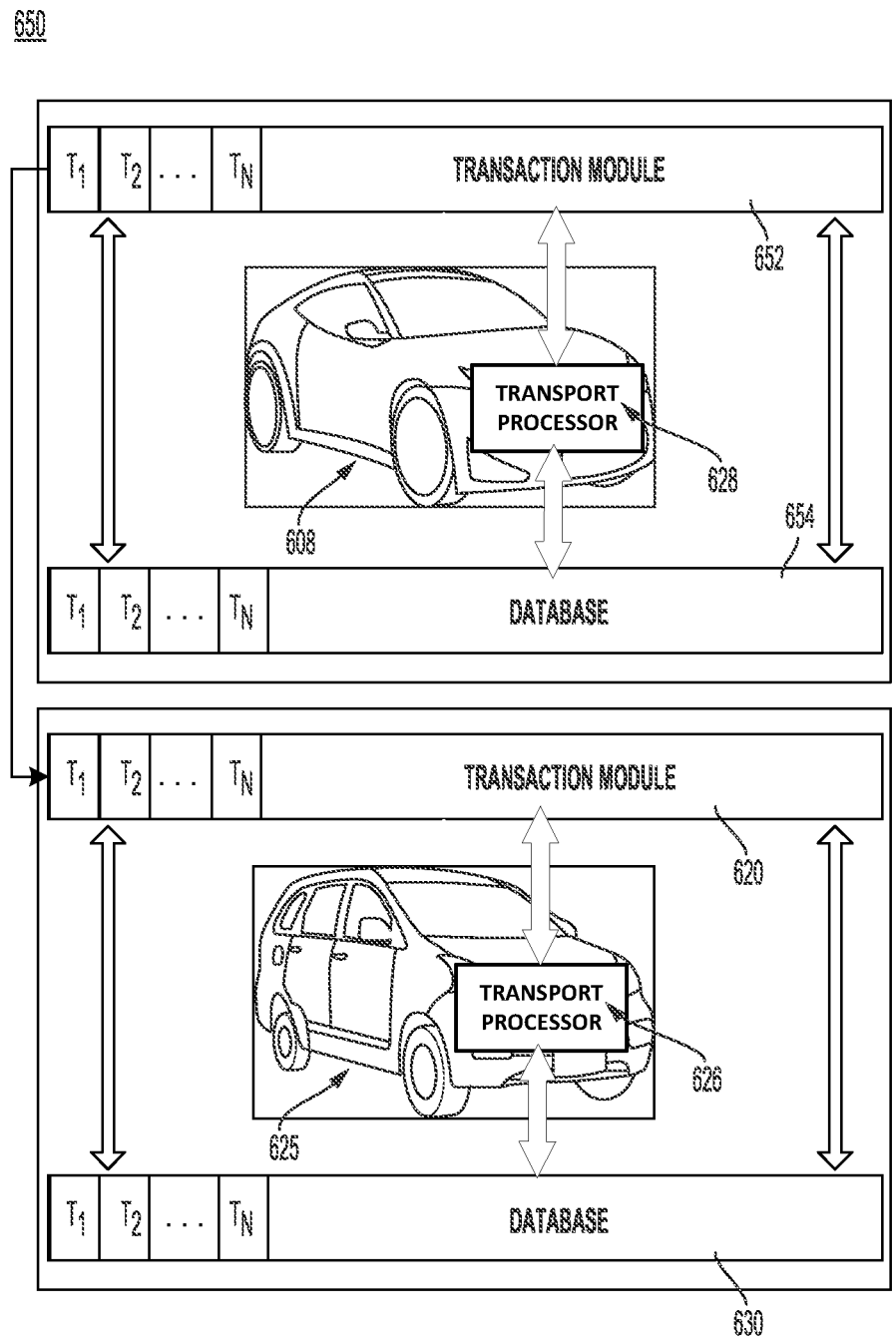
FIG. 6B illustrates another example vehicle configuration for managing database transactions conducted among various vehicles, according to example embodiments

FIG. 6B illustrates an example vehicle configuration 650 for managing database transactions conducted among various vehicles, according to example embodiments. The vehicle 625 may engage with another vehicle 608 to perform various actions such as to share, transfer, acquire service calls, etc. when the vehicle has reached a status where the services need to be shared with another vehicle. For example, the vehicle 608 may be due for a battery charge and/or may have an issue with a tire and may be in route to pick up a package for delivery. A transport processor 628 resides in the vehicle 608 and communication exists between the transport processor 628, a database 654, a transport processor 628 and the transaction module 652. The vehicle 608 may notify another vehicle 625 which is in its network and which operates on its blockchain member service. A transport processor 626 resides in the vehicle 625 and communication exists between the transport processor 626, a database 630, the transport processor 626 and a transaction module 620. The vehicle 625 may then receive the information via a wireless communication request to perform the package pickup from the vehicle 608 and/or from a server (not shown). The transactions are logged in the transaction modules 652 and 620 of both vehicles. The credits are transferred from vehicle 608 to vehicle 625 and the record of the transferred service is logged in the database 630/654 assuming that the blockchains are different from one another, or, are logged in the same blockchain used by all members. The database 654 can be one of a SQL database, an RDBMS, a relational database, a non-relational database, a blockchain, a distributed ledger, and may be on board the transport, may be off board the transport, may be accessible directly and/or through a network.

Figure 7A:
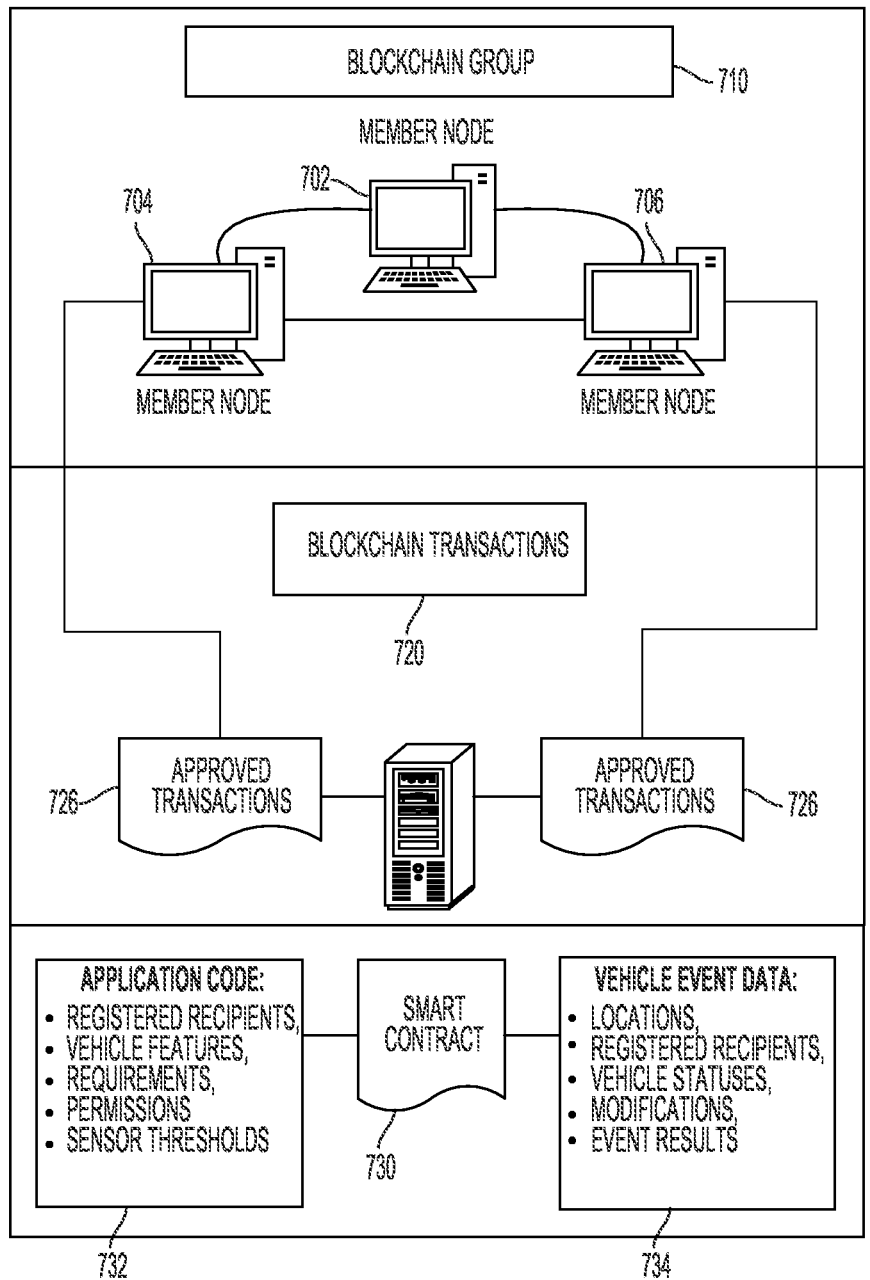
FIG. 7A illustrates a blockchain architecture configuration, according to example embodiments.

FIG. 7A illustrates a blockchain architecture configuration 700, according to example embodiments. Referring to FIG. 7A, the blockchain architecture 700 may include certain blockchain elements, for example, a group of blockchain member nodes 702-706 as part of a blockchain group 710. In one example embodiment, a permissioned blockchain is not accessible to all parties but only to those members with permissioned access to the blockchain data. The blockchain nodes participate in a number of activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 720 are stored in memory of computers as the transactions are received and approved by the consensus model dictated by the members' nodes. Approved transactions 726 are stored in current blocks of the blockchain and committed to the blockchain via a committal procedure, which includes performing a hash of the data contents of the transactions in a current block and referencing a previous hash of a previous block. Within the blockchain, one or more smart contracts 730 may exist that define the terms of transaction agreements and actions included in smart contract executable application code 732, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 734, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 730, which are then stored in a blockchain. For example, sensor thresholds stored in the smart contract can be used as the basis for whether a detected service is necessary and when and where the service should be performed.

Figure 7B:
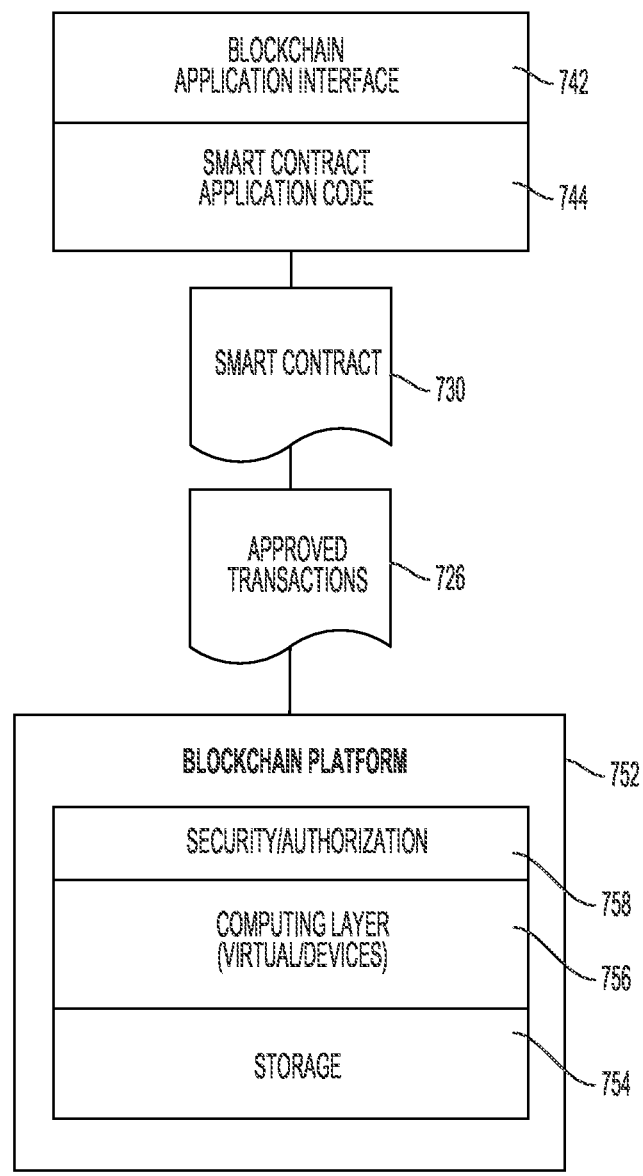
FIG. 7B illustrates another blockchain configuration, according to example embodiments.

FIG. 7B illustrates a shared ledger configuration, according to example embodiments. Referring to FIG. 7B, the blockchain logic example 740 includes a blockchain application interface 742 as an application programming interface (API) or plug-in application that links to the computing device and execution platform for a particular transaction. The blockchain configuration 740 may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code 744 provides a basis for the blockchain transactions by establishing application code which when executed causes the transaction terms and conditions to become active. The smart contract 730, when executed, causes certain approved transactions 726 to be generated, which are then forwarded to the blockchain platform 752. The platform includes a security/authorization 758, computing devices, which execute the transaction management 756, and a storage portion 754 as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 7A and 7B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code, which is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 7C:
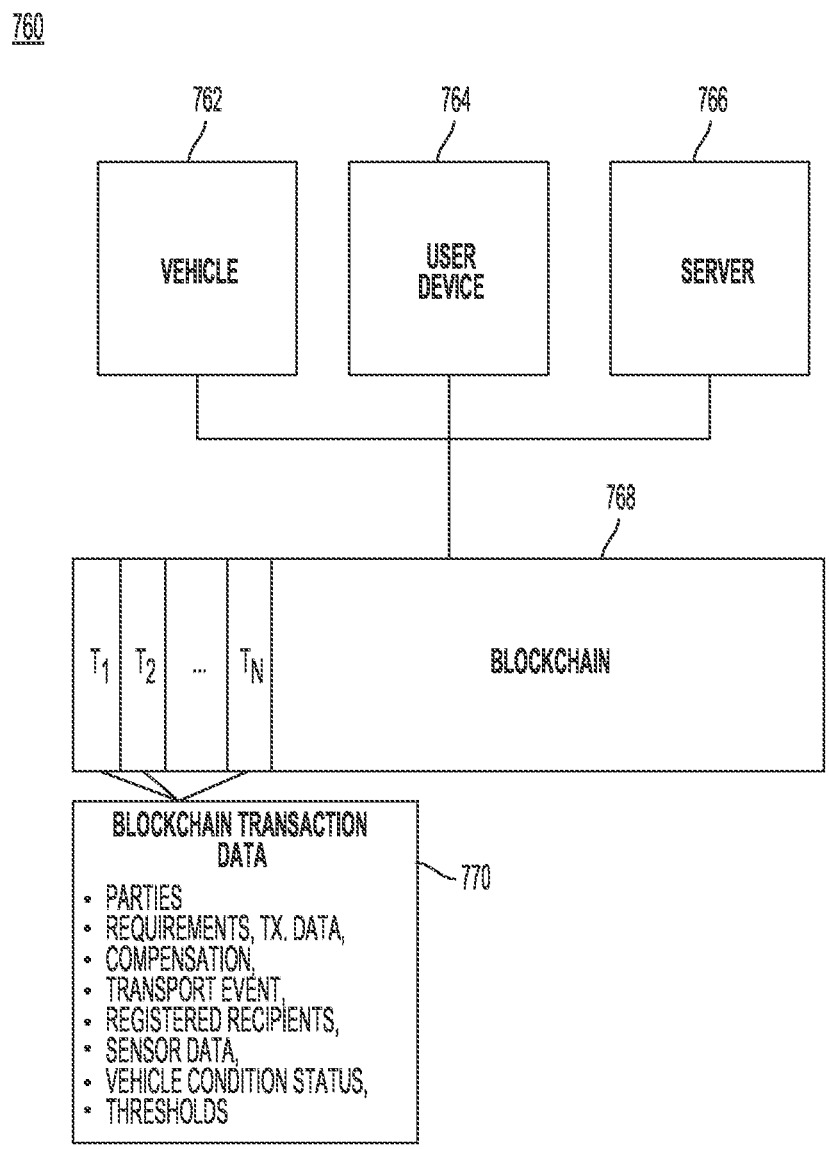
FIG. 7C illustrates a blockchain configuration for storing blockchain transaction data, according to example embodiments.

FIG. 7C illustrates a blockchain configuration for storing blockchain transaction data, according to example embodiments. Referring to FIG. 7C, the example configuration 760 provides for the vehicle 762, the user device 764 and a server 766 sharing information with a distributed ledger (i.e., blockchain) 768. The server may represent a service provider entity inquiring with a vehicle service provider to share user profile rating information in the event that a known and established user profile is attempting to rent a vehicle with an established rated profile. The server 766 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 770 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 7D:
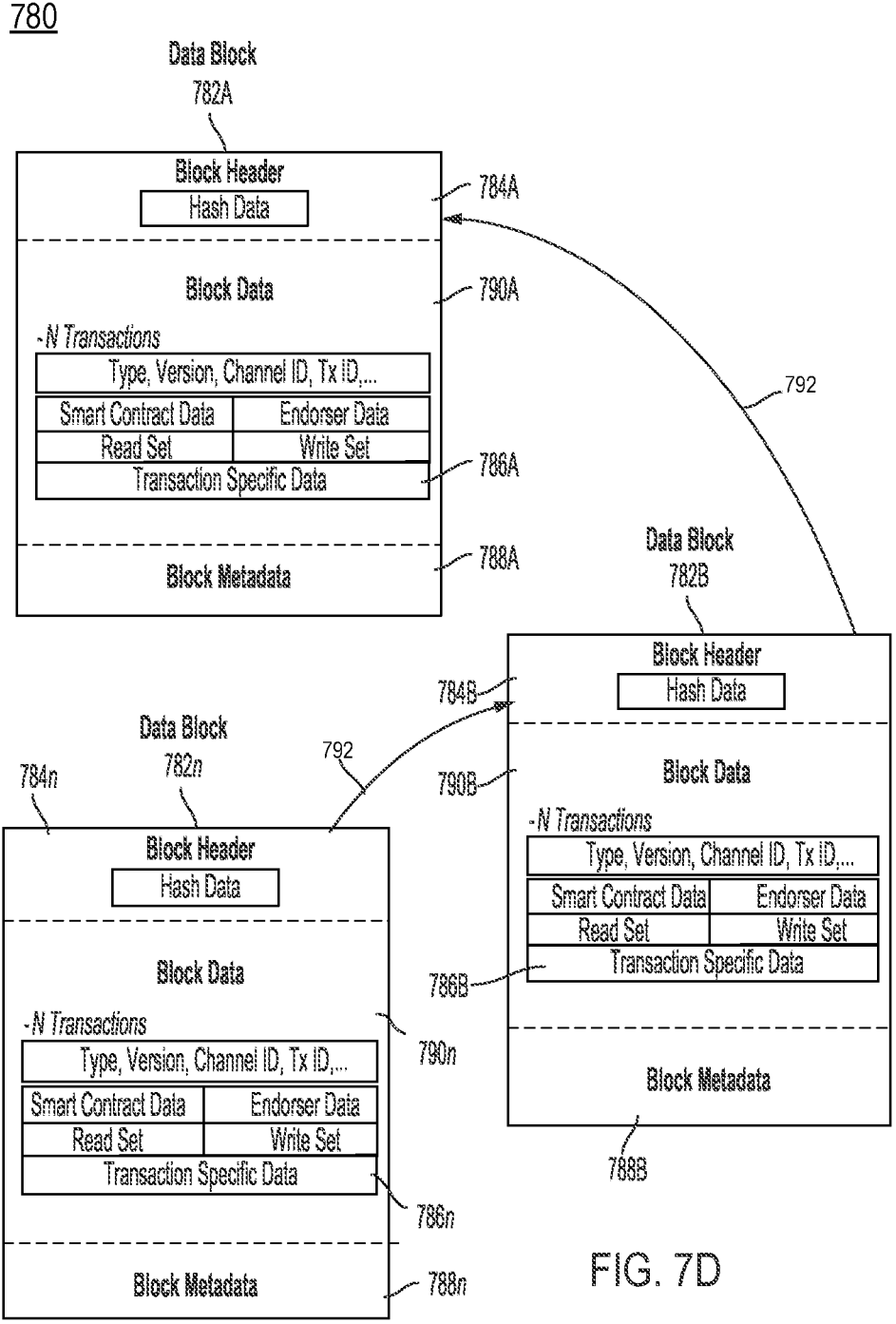
FIG. 7D illustrates example data blocks, according to example embodiments.

FIG. 7D illustrates blockchain blocks 780 that can be added to a distributed ledger, according to example embodiments, and contents of block structures 782A to 782n. Referring to FIG. 7D, clients (not shown) may submit entries to blockchain nodes to enact activity on the blockchain. As an example, clients may be applications that act on behalf of a requester, such as a device, person or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain which stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 7D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup, before entries are accepted.

Endorsing nodes receive entries from clients and endorse the entry based on simulated results. Endorsing nodes hold smart contracts, which simulate the entry proposals. When an endorsing node endorses an entry, the endorsing node creates an entry endorsement, which is a signed response from the endorsing node to the client application indicating the endorsement of the simulated entry. The method of endorsing an entry depends on an endorsement policy, which may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 682A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 7D, a block 782A (also referred to as a data block) that is stored on the blockchain and/or the distributed ledger may include multiple data segments such as a block header 784A to 784n, transaction specific data 786A to 786n, and block metadata 788A to 788n. It should be appreciated that the various depicted blocks and their contents, such as block 782A and its contents are merely for purposes of an example and are not meant to limit the scope of the example embodiments. In some cases, both the block header 784A and the block metadata 788A may be smaller than the transaction specific data 786A which stores entry data; however, this is not a requirement. The block 782A may store transactional information of N entries (e.g., 100, 500, 1000, 2000, 3000, etc.) within the block data 790A to 790n. The block 782A may also include a link to a previous block (e.g., on the blockchain) within the block header 784A. In particular, the block header 784A may include a hash of a previous block's header. The block header 784A may also include a unique block number, a hash of the block data 790A of the current block 782A, and the like. The block number of the block 782A may be unique and assigned in an incremental/sequential order starting from zero. The first block in the blockchain may be referred to as a genesis block, which includes information about the blockchain, its members, the data stored therein, etc.

The block data 790A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 790A may also store transaction specific data 786A which adds additional information to the hash-linked chain of blocks in the blockchain. Accordingly, the data 786A can be stored in an immutable log of blocks on the distributed ledger. Some of the benefits of storing such data 786A are reflected in the various embodiments disclosed and depicted herein. The block metadata 788A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 690A and a validation code identifying whether an entry was valid/invalid.

The other blocks 782B to 782n in the blockchain also have headers, files, and values. However, unlike the first block 782A, each of the headers 784A to 784n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 792, to establish an auditable and immutable chain-of-custody.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
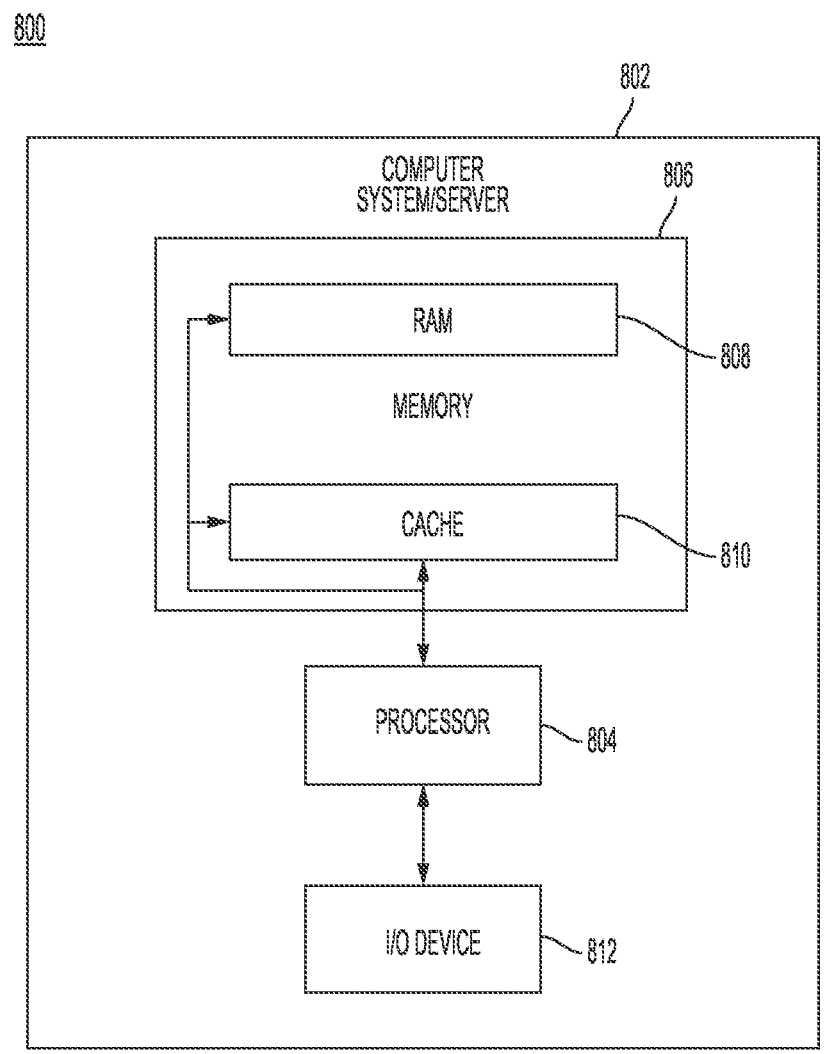
FIG. 8 illustrates an example system that supports one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments, where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 808 and/or cache memory 810. Computer system/server 802 may further include other removable/non-removable, volatile/non-volatile computer system storage media. By way of example only, memory 806 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility, having a set (at least one) of program modules, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices via an I/O device 812 (such as an I/O adapter), which may include a keyboard, a pointing device, a display, a voice recognition module, etc., one or more devices that enable a user to interact with computer system/server 802, and/or any devices (e.g., network card, modem, etc.) that enable computer system/server 802 to communicate with one or more other computing devices. Such communication can occur via I/O interfaces of the device 812. Still yet, computer system/server 802 can communicate with one or more networks such as a local area network (LAN), a general wide area network (WAN), and/or a public network (e.g., the Internet) via a network adapter. As depicted, device 812 communicates with the other components of computer system/server 802 via a bus. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
in response to determining that a plurality of alternate transports cannot be configured to mimic a travel experience of a transport, displaying, via a server, a list of the plurality of alternate transports and information about the plurality of alternate transports via a graphical user interface of the transport to enable a user to choose a best alternative;
receiving, from the transport, a selection of an alternate transport from among the plurality of alternate transports via the graphical user interface;
receiving, via the graphical user interface of the transport, inputs which configure a parameter of a subsystem within the alternate transport;
causing, via the server, the alternate transport to configure the subsystem within the alternate transport based on the inputs received via the graphical user interface of the transport; and
routing the configured alternate transport to a location of the transport.

2. The method of claim 1, wherein the routing comprises transferring an intended destination of the transport to a navigation system of the alternate transport.

3. The method of claim 1, further comprising:
determining that the plurality of alternate transports cannot be configured to match user-configured settings based on unavailable parameters of the plurality of alternate transports.

4. The method of claim 1, wherein the causing comprises causing the alternate transport to modify a parameter of the alternate transport from a group of parameters consisting of seat position, seat temperature, seat location, an infotainment option, and an ambient temperature.

5. The method of claim 1, further comprising:
determining, by the server, the location of the transport;
determining, by the server, an alternate location of the alternate transport; and
determining, by the server, an estimated time of arrival of the alternate transport to the transport based on the location of the transport and the location of the alternate transport.

6. The method of claim 5, further comprising displaying the estimated time of arrival of the alternate transport via the graphical user interface within the transport.

7. The method of claim 1, wherein the pinging method further comprises:
receiving, by the server, a message of an initial configuration of the transport; and
receiving, by the server, a second message of a change in the initial configuration of the transport in response to being pinged,
wherein said configuring, by the server, the alternate transport further comprises configuring the alternate transport based on both the initial configuration and the change in the initial configuration.

8. A server, comprising:
a processor configured to:
in response to a determination that a plurality of alternate transports cannot be configured to mimic a travel experience of a transport, display a list of a plurality of alternate transports and information about the plurality of alternate transports via a graphical user interface of the transport to enable a user to choose a best alternative;
receive, from the transport, a selection of an alternate transport from among the plurality of alternate transports via the graphical user interface;
receive, via the graphical user interface of the transport, inputs which configure a parameter of a subsystem within the alternate transport;
cause the alternate transport to configure the subsystem within the alternate transport based on the inputs received via the graphical user interface of the transport; and
route the configured alternate transport to a location of the transport.

9. The server of claim 8, wherein the route comprises a transfer of an intended destination of the transport to a navigation system of the alternate transport.

10. The server of claim 8, wherein the processor is further configured to
determine that the plurality of alternate transports cannot be configured to match user-configured settings based on unavailable parameters of the plurality of alternate transports.

11. The server of claim 8, wherein the processor is configured to cause the alternate transport to modify a parameter of the alternate transport from a group of parameters that consist of seat position, seat temperature, seat location, an infotainment option, and ambient temperature.

12. The server of claim 8, wherein the processor is configured to:
determine the location of the transport;
determine an alternate location of the alternate transport; and
determine an estimated time of arrival of the alternate transport to the transport based on the location of the transport and the location of the alternate transport.

13. The server of claim 12, wherein the processor is configured to display, via the graphical user interface within the transport, the estimated time of arrival of the alternate transport at the transport.

14. The server of claim 8, wherein the processor is configured to:
receive a message of an initial configuration of the transport; and
receive a second message of a change in the initial configuration of the transport in response to being pinged,
wherein the processor is further configured to configure the alternate transport based on both the initial configuration and the change in the initial configuration.

15. A non-transitory computer readable medium comprising instructions, that when read by a processor, cause the processor to perform:
in response to determining that a plurality of alternate transports cannot be configured to mimic a travel experience of a transport, displaying, via a server, a list of a plurality of alternate transports and information about the plurality of alternate transports via a graphical user interface of the transport to enable a user to choose a best alternative;
receiving, from the transport, a selection of an alternate transport from among the plurality of alternate transports via the graphical user interface;
receiving, via the graphical user interface of the transport, inputs which configure a parameter of a subsystem within the alternate transport;

causing, via the server, the alternate transport to configure the subsystem within the alternate transport based on the inputs received via the graphical user interface of the transport; and routing the configured alternate transport to a location of the transport when the transport is inoperable.

16. The non-transitory computer readable medium of claim 15, wherein the routing comprises transferring an intended destination of the transport to a navigation system of the alternate transport.

17. The non-transitory computer readable medium of claim 15, wherein the processor is further configured to perform:

determining that the plurality of alternate transports cannot be configured to match user-configured settings based on unavailable parameters of the plurality of alternate transports.

18. The non-transitory computer readable medium of claim 15, wherein the causing comprises causing the alternate transport to modify a parameter of the alternate transport from a group of parameters consisting of seat position, seat temperature, seat location, an infotainment option, and an ambient temperature.

19. The non-transitory computer readable medium of claim 15, wherein the processor is further configured to perform:

determining the location of the transport;

determining an alternate location of the alternate transport; and determining an estimated time of arrival of the alternate transport to the transport based on the location of the transport and the location of the alternate transport.

20. The non-transitory computer readable medium of claim 19, wherein the processor is further configured to perform:

displaying the estimated time of arrival of the alternate transport via the graphical user interface of the transport.

* * * * *